United States Patent
Tsutsumi et al.

(10) Patent No.: US 11,749,291 B2
(45) Date of Patent: *Sep. 5, 2023

(54) AUDIO SIGNAL DISCONTINUITY CORRECTION PROCESSING SYSTEM

(71) Applicant: NTT DOCOMO, INC., Tokyo (JP)

(72) Inventors: Kimitaka Tsutsumi, Tokyo (JP); Kei Kikuiri, Tokyo (JP); Atsushi Yamaguchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,321

(22) Filed: Jan. 13, 2022

(65) Prior Publication Data

US 2022/0139411 A1 May 5, 2022

Related U.S. Application Data

(63) Continuation of application No. 16/844,653, filed on Apr. 9, 2020, now Pat. No. 11,270,715, which is a
(Continued)

(30) Foreign Application Priority Data

Oct. 29, 2013 (JP) ................................. 2013-224120

(51) Int. Cl.
*G10L 19/09* (2013.01)
*G10L 19/005* (2013.01)
(Continued)

(52) U.S. Cl.
CPC ............ *G10L 19/09* (2013.01); *G10L 19/005* (2013.01); *G10L 19/135* (2013.01); *H04L 1/00* (2013.01);
(Continued)

(58) Field of Classification Search
CPC ...... G10L 19/09; G10L 19/005; G10L 19/135; H04L 1/00
(Continued)

(56) References Cited

U.S. PATENT DOCUMENTS

| 7,590,525 B2 | 9/2009 | Chen |
| 8,255,210 B2 * | 8/2012 | Sato ...................... G10L 19/005 704/258 |

(Continued)

FOREIGN PATENT DOCUMENTS

| CN | 103229234 A | 7/2013 |
| CN | 105393303 B | 7/2019 |

(Continued)

OTHER PUBLICATIONS

Recommendation ITU-T G.718, (Jun. 2008), "Frame Error Robust Narrow-Band and Wideband Embedded Variable Bit-Rate Coding of Speech and Audio From 8-32 kbit/s", *International Telecommunication Union*, Jun. 2008, 150 pages.
(Continued)

*Primary Examiner* — Susan I McFadden
(74) *Attorney, Agent, or Firm* — Crowell & Moring LLP

(57) ABSTRACT

An audio signal processing system and method is executed by an audio signal processing device to decode an audio packet to obtain decoded audio and determine an occurrence of a discontinuity occurring with a sudden increase of an amplitude of the decoded audio obtained by decoding the audio packet. The audio packet may be received correctly after an occurrence of a packet loss, and corrected to improve subjective quality of the decoded audio, wherein correcting the discontinuity of the decoded audio comprises causing distances between ISF/LSF parameters corresponding to a frame in which a packet loss has occurred to be equal.

2 Claims, 32 Drawing Sheets

Related U.S. Application Data continuation of application No. 16/163,118, filed on Oct. 17, 2018, now Pat. No. 10,621,999, which is a continuation of application No. 15/706,474, filed on Sep. 15, 2017, now Pat. No. 10,152,982, which is a continuation of application No. 15/141,346, filed on Apr. 28, 2016, now Pat. No. 9,799,344, which is a continuation of application No. PCT/JP2014/077215, filed on Oct. 10, 2014.

(51) Int. Cl.
*H04L 1/00* (2006.01)
*G10L 19/135* (2013.01)
*G10L 19/07* (2013.01)
*G10L 19/00* (2013.01)

(52) U.S. Cl.
CPC ....... *G10L 19/07* (2013.01); *G10L 2019/0011* (2013.01)

(58) Field of Classification Search
USPC ......................................................... 704/223
See application file for complete search history.

(56) References Cited

U.S. PATENT DOCUMENTS

| | | | | |
|---|---|---|---|---|
| 9,799,344 | B2 * | 10/2017 | Tsutsumi | G10L 19/09 |
| 10,152,982 | B2 * | 12/2018 | Tsutsumi | H04L 1/00 |
| 10,621,999 | B2 * | 4/2020 | Tsutsumi | G10L 19/09 |
| 11,217,261 | B2 * | 1/2022 | Ravelli | G10L 19/005 |
| 11,270,715 | B2 * | 3/2022 | Tsutsumi | G10L 19/09 |
| 2008/0126904 | A1 | 5/2008 | Sung et al. | |
| 2010/0057447 | A1 | 3/2010 | Ehara | |

FOREIGN PATENT DOCUMENTS

| | | |
|---|---|---|
| EP | 2 450 883 A1 | 5/2012 |
| EP | 2 645 366 A1 | 10/2013 |
| JP | 2001-228896 A | 8/2001 |
| JP | 2010-511201 A | 4/2010 |
| JP | 2012-113235 | 6/2012 |
| JP | 5981408 | 8/2016 |
| WO | WO 2002/035520 A2 | 5/2002 |
| WO | WO 2008/056775 A1 | 5/2008 |
| WO | WO 2008/066264 A1 | 6/2008 |
| WO | WO 2008/108080 A1 | 9/2008 |

OTHER PUBLICATIONS

Search Report, and English language translation thereof, in corresponding International Application No. PCT/JP2014/077215, dated Dec. 22, 2014, 5 pages.
International Preliminary Report on Patentability in corresponding International Application No. PCT/JP2014/077215, dated May 12, 2016, 7 pages.
Extended Search Report in corresponding European Application No. 14857728.1, dated Aug. 2, 2016, 8 pages.
Office Action in corresponding Australian Application No. 2014341476, dated Oct. 6, 2016, 3 pages.
Technical Specification: "Audio Codec Processing Functions; Extended Adaptive Multi-Rate-Wideband (AMR-WB+) Codec; Transcoding Functions (3GPP TS 26.290, Version 7.0.0, Release 7)", Global System for Mobile Communications, Mar. 2007, 87 pages.
Office Action, and English language translation thereof, in corresponding Korean Application No. 10-2016-7002244, dated Nov. 21, 2016, 9 pages.
"European Office Action," dated Jul. 12, 2017, pp. 1-4, cited in European Patent Application No. 14857728.1, European Patent Office, Rijswijk, The Netherlands.
"Canadian Office Action," dated Jul. 11, 2017, pp. 1-5, cited in Canadian Patent Application No. 2,918,715, Canadian Intellectual Property Office, Gatineau, Quebec.
Office Action, and English language translation thereof, in corresponding Russian Application No. 2016120629, dated Oct. 20, 2017, 14 pages.
Office Action, in corresponding Korean Application No. 10-2017-7032708, dated Feb. 5, 2018, 7 pages.
Chinese Office Action with English translation, dated Aug. 2, 2018, pp. 1-15, issued in Chinese Patent Application No. 201480041188.2, State Intellectual Property Office of China, Beijing, People's Republic of China.
Korean Office Action with English translation, dated Oct. 22, 2018, pp. 1-8, issued in Korean Patent Application No. 10-2017-7032708, Korean Intellectual Property Office, Daejeon, Republic of Korea.
India Office Action, dated Dec. 20, 2018, pp. 1-7, issued in India Patent Application No. 201617003088, Intellectual Property India, New Delhi, India.
Extended European Search Report, dated Jul. 4, 2019, pp. 1-8, issued in European Patent Application No. 19167283.1, European Patent Office, The Hague, The Netherlands.
Australian Examination Report No. 1, dated Nov. 29, 2019, pp. 1-3, issued in Australian Patent Application No. 2018274861, Office of IP Australia, Woden, ACT, Australia.
Korean Office Action with English translation, dated Jan. 6, 2020, pp. 1-10, issued in Korean Patent Application No. 10-2019-7030949, Korean Intellectual Property Office, Daejeon, Republic of Korea.
Office Action/EP Communication Pursuant to Article 94(3) EPC, in Europe Application No. 19167229.4, dated Oct. 5, 2021, 4 pages.*.
Notification of Office Action with English Translation, dated Jul. 8, 2020, pp. 1-8, issued in Brazilian Application No. 122017020760-1, Federal Public Service Ministry of The Economy National Institute of Industrial Property, Rio De Janeiro, Brazil.
Brazilian Office Action, dated Aug. 18, 2020, pp. 1-8, issued in Brazilian Patent Application No. BR112016003291-8, Federal Public Service Ministry of Economy National Institute of Industrial Property, Rio de Janeiro, Brazil.
Office Action in Malaysian Application No. PI2018702836, dated Aug. 28, 2021, 3 pages.
India Office Action, dated Apr. 21, 2022, pp. 1-2, issued in Indian Patent Application No. 201617003088, Intellectual Property India, Guindy, Chennai, India.
Chinese Office Action with English Translation, dated Oct. 27, 2022, pp. 1-19, issued in China Patent Application No. 201910588565.9, China National Intellectual Property Administration, Beijing, China.
Australian Office Action, dated Dec. 20, 2022, pp. 1-2, issued in Australian patent application No. 2021290404, IP Australia, Phillip ACT.
Chinese Office Action—Decision of Rejection with English Translation, dated May 29, 2023, pp. 1-8, issued in Chinese patent application No. 201910588809.3, China National Intellectual Property Administration, Beijing, China.
Chinese Office Action—2nd Notification of Office Action with English Translation, dated Jun. 16, 2023, pp. 1-13, issued in Chinese patent application No. 201910588565.9, China National Intellectual Property Administration, Beijing, China.

* cited by examiner

US 11,749,291 B2

AUDIO SIGNAL DISCONTINUITY CORRECTION PROCESSING SYSTEM

RELATED APPLICATIONS

This application is a continuation of U.S. application Ser. No. 16/844,653, filed Apr. 9, 2020, which is a continuation of U.S. application Ser. No. 16/163,118, filed Oct. 17, 2018, which is a continuation of U.S. application Ser. No. 15/706,474 filed on Sep. 15, 2017, which is a continuation of U.S. application Ser. No. 15/141,346 filed on Apr. 28, 2016, which is a continuation application of PCT/JP2014/077215 filed on Oct. 10, 2014, which claims priority to Japanese Application No. 2013-224120 filed on Oct. 29, 2013. The entire contents of these applications are incorporated herein by reference.

TECHNICAL FIELD

The present invention relates to an audio signal processing device, an audio signal processing method, and an audio signal processing program for processing an audio signal.

BACKGROUND ART

In transmission of a coded and packetized audio signal through an Internet network with an IP (Internet Protocol) phone, a packet can be lost because of a network congestion or the like (this phenomenon will be referred to hereinafter as "packet loss"). With an occurrence of a packet loss, necessary audio codes are lost resulting in a failure in decoding of audio, thereby causing an audio discontinuity. A technology for preventing an audio discontinuity caused by a packet loss is an audio packet loss concealment technology. The audio packet loss concealment technology is designed to detect a packet loss and generate a pseudo audio signal corresponding to the lost packet (which will be referred to hereinafter as "concealment signal").

When an audio encoding technique used is a technique of performing audio encoding while updating internal states of encoder/decoder, encoding parameters to be originally received are not obtained and thus the audio packet loss concealment technology includes performing an update of the internal states of the decoder by use of artificially-generated parameters as well.

The CELP (Code Excited Linear Prediction) encoding is widely used as a technique for performing the audio encoding while updating the internal states of encoder/decoder. In the CELP encoding, an autoregressive model is assumed, and an excitation signal e(n) is filtered by an all-pole synthesis filter a(i) to synthesize an audio signal. Namely, the audio signal s(n) is synthesized according to the below equation. In the equation below, a(i) represents linear prediction coefficients (LP (Linear Prediction) coefficients) and the degree to be used is a value such as P=16.

$$s(n) = e(n) - \sum_{i=1}^{P} a(i) \cdot s(n-i)$$ [Mathematical Equation 1]

In the CELP encoding, the internal states stored include ISF (Immittance Spectral Frequency) parameters as mathematically equivalent representation of the linear prediction coefficients, and a past excitation signal. With an occurrence of a packet loss, these are artificially generated, and there arises a deviation from the original parameters that would be obtained by decoding. An inconsistency of a synthesized audio caused by a deviation of the parameters is perceived as a noise by a listener, which significantly degrades the subjective quality.

The paragraphs below will describe a configuration and an operation of an audio decoder to perform the audio packet loss concealment, using an example where the CELP encoding is used as the audio encoding technique.

A configuration diagram and an operation of the audio decoder are shown in FIG. 1 and FIG. 2. As shown in FIG. 1, an audio decoder 1 has a packet loss detector 11, an audio code decoder 12, a concealment signal generator 13, and an internal state buffer 14.

The packet loss detector 11, when receiving an audio packet correctly, sends a control signal, and audio codes included in the audio packet, to the audio code decoder 12 (normal reception: YES in step S100 in FIG. 2). Thereafter, the audio code decoder 12 performs decoding of the audio codes and updating of the internal states as described below (steps S200 and S400 in FIG. 2). On the other hand, the packet loss detector 11, when failing to receive an audio packet correctly, sends a control signal to the concealment signal generator 13 (packet loss: NO in step S100 in FIG. 2). Thereafter, the concealment signal generator 13 generates a concealment signal and updates the internal states as described below (steps S300 and S400 in FIG. 2). The processes of steps S100 to S400 in FIG. 2 are repeated to the end of communication (or until step S500 results in a determination of YES).

The audio codes include at least encoded ISF parameters $$\dot{\omega}_i,$$ [Mathematical Equation 2]

(Equation 2 is incomplete)
encoded pitch lags $T^j_p$ of the first to fourth subframes, encoded adaptive codebook gains $g^j_p$ of the first to fourth subframes, encoded fixed codebook gains $g^j_c$ of the first to fourth subframes, and encoded fixed codebook vectors $c^j(n)$ of the first to fourth subframes. The ISF parameters may be replaced by LSF (line spectral frequency) parameters which are mathematically equivalent representation thereof. Although the discussion below uses the ISF parameters, the same discussion may also be true for the case using the LSF parameters.

The internal state buffer includes past ISF parameters $$\omega_i^{-1}$$ [Mathematical Equation 3]

and, as equivalent representation of $$\omega_i^{-1}$$ [Mathematical Equation 4]

ISP (Immittance Spectral Pair) Parameters $$\dot{q}_i^{-1}$$ [Mathematical Equation 5]

ISF Residual Parameters $$\dot{r}_i^{-1}$$ [Mathematical Equation 6]

past pitch lags $T^j_p$, past adaptive codebook gains $g^j_p$, past fixed codebook gains $g^j_c$, and an adaptive codebook u(n). It is determined, depending upon a design principle, how many subframes of the past parameters should be included. It is assumed in the present specification that one frame includes four subframes, but another value may be adopted depending upon the design principle.

<Case of Normal Reception>

FIG. 3 shows an exemplary functional configuration of the audio code decoder 12. As shown in this FIG. 3, the audio code decoder 12 has an ISF decoder 120, a stability processor 121, an LP coefficient calculator 122, an adaptive codebook calculator 123, a fixed codebook decoder 124, a gain decoder 125, an excitation vector synthesizer 126, a post-filter 127, and a synthesis filter 128. It should be noted, however, that the post-filter 127 is not an indispensable constitutive element. In FIG. 3, for convenience of explanation, the internal state buffer 14 is indicated by a double-dot line inside the audio code decoder 12. However, the internal state buffer 14 is not included inside the audio code decoder 12, but is indeed the internal state buffer 14 itself shown in FIG. 1. The same is also true in the configuration diagrams of the audio code decoder hereinafter.

A configuration diagram of the LP coefficient calculator 122 is shown in FIG. 4 and a processing flow of calculation of LP coefficients from the encoded ISF parameters is shown in FIG. 5. As shown in FIG. 4, the LP coefficient calculator 122 has an ISF-ISP converter 122A, an ISP interpolator 122B, and an ISP-LPC converter 122C.

First described are a functional configuration and its operation associated with the process of calculating the LP coefficients from the encoded ISF parameters (FIG. 5).

The ISF decoder 120 decodes the encoded ISF parameters to obtain the ISF residual parameters $$\dot{r}_i^0 \quad \text{[Mathematical Equation 7]}$$

and calculates the ISF parameters $$\dot{\omega}i \quad \text{[Mathematical Equation 8]}$$

in accordance with the following equation (step S1 in FIG. 5). Here, $mean_i$ represents mean vectors obtained in advance by learning or the like.

$$\dot{\omega}_i = mean_i + \dot{r}_i^0 + \frac{1}{3}\dot{r}_i^{-1} \quad \text{[Mathematical Equation 9]}$$

The example of using an MA prediction for the calculation of the ISF parameters is described herein, but it is also possible to adopt a configuration to perform calculation of the ISF parameters using an AR prediction as described below. Here, the ISF parameters of the immediately preceding frame are denoted by $$\dot{\omega}_i^{-1} \quad \text{[Mathematical Equation 10]}$$

and weight factors of the AR prediction by $\rho_i$.

$$\dot{\omega}_i = mean_i + \rho_i(\dot{\omega}_i^{-1} - mean_i) \quad \text{[Mathematical Equation 11]}$$

The stability processor 121 performs a process according to the below equation so as to place a distance of not less than 50 Hz between elements of the ISF parameters in order to secure stability of the filter (step S2 in FIG. 5). The ISF parameters are indicative of a line spectrum representing the shape of an audio spectrum envelope, and as the distance between them becomes shorter, peaks of the spectrum become larger, causing resonance. For this reason, the process for securing stability becomes necessary to prevent gains from becoming too large at the peaks of the spectrum. Here, min_dist represents a minimum ISF distance, and isf_min represents a minimum of ISF necessary for securing the distance of min_dist. isf_min is successively updated by adding the distance of min_dist to a value of neighboring ISF. On the other hand, isf_max represents a maximum of ISF necessary for securing the distance of min_dist. isf_max is successively updated by subtracting the distance of min_dist from a value of neighboring ISF.

isf_min=min_dist=50 for $i$=0 to 14 if $\dot{\omega}_i$<isf_min then $\dot{\omega}_i$=isf_min isf_min=$\dot{\omega}_i$+min_dist isf_max=6400−min_dist if $\dot{\omega}_{14}$>isf_max for $i$=14 down to 1 if $\dot{\omega}_i$>isf_max then $\dot{\omega}_i$=isf_max isf_max=$\dot{\omega}_i$−min_dist [Mathematical Equation 12]

The ISF-ISP converter 122A in the LP coefficient calculator 122 converts $$\dot{\omega}_i \quad \text{[Mathematical Equation 13]}$$

into ISP parameters $$\dot{q}_i \quad \text{[Mathematical Equation 14]}$$

in accordance with the following equation (step S3 in FIG. 5). Here, C is a constant determined in advance.

$$\dot{q}_i = \cos(C \cdot \dot{\omega}_i) \quad \text{[Mathematical Equation 15]}$$

The ISP interpolator 122B calculates the ISP parameters for the respective subframes from the past ISP parameters $$\dot{q}_i^{-1} \quad \text{[Mathematical Equation 16]}$$

included in the internal state buffer 14 and the foregoing ISP parameters $$\dot{q}_i \quad \text{[Mathematical Equation 17]}$$

in accordance with the below equation (step S4 in FIG. 5). Other coefficients may be used for the interpolation.

$$q_i^{(1)}=0.75 \cdot \dot{q}_i^{-1}+0.25 \cdot \dot{q}_i$$

$$q_i^{(2)}=0.5 \cdot \dot{q}_i^{-1}+0.5 \cdot \dot{q}_i$$

$$q_i^{(3)}=0.25 \cdot \dot{q}_i^{-1}+0.75 \cdot \dot{q}_i$$

$$q_i^{(4)}=\dot{q}_i \quad \text{[Mathematical Equation 18]}$$

The ISP-LPC converter 122C converts the ISP parameters for the respective subframes into LP coefficients $$\dot{a}_i^j (0<i \leq P, 0 \leq j<4) \quad \text{[Mathematical Equation 19]}$$

(step S5 in FIG. 5). A specific conversion procedure to be used can be the processing procedure described in Non Patent Literature 1. The number of subframes included in a look-ahead signal is assumed to be 4 herein, but the number of subframes may differ, depending upon the design principle.

Next described are other configurations and operations in the audio code decoder 12.

The adaptive codebook calculator 123 decodes encoded pitch lags to calculate the pitch lags $T^j_P$ of the first to fourth subframes. Then, the adaptive codebook calculator 123 uses the adaptive codebook u(n) to calculate adaptive codebook vectors for the respective subframes in accordance with the below equation. The adaptive codebook vectors are calculated by interpolating the adaptive codebook u(n) by a FIR filter Int(i). Here, the length of the adaptive codebook is denoted by $N_{adapt}$. The filter Int(i) used for the interpolation is an FIR filter with a predetermined length 2l+1, and L' presents the sample number of the subframes. By using the interpolation filter Int(i), the pitch lags can be utilized to the accuracy of decimal places. For the details of the interpolation filter, the method described in Non Patent Literature 1 can be referred to.

$$v^j(n) = \sum_{i=-1}^{i} \text{Int}(i) \cdot u(n + N_{adapt} - \hat{T}_p^{(j)} + i)$$  [Mathematical Equation 20]

$$(0 \leq n < L')$$

The fixed codebook decoder 124 decodes the encoded fixed codebook vectors to acquire the fixed codebook vectors $c^j(n)$ of the first to fourth subframes.

The gain decoder 125 decodes the encoded adaptive codebook gains and the encoded fixed codebook gains to acquire the adaptive codebook gains and fixed codebook gains of the first to fourth subframes. For example, the decoding of the adaptive codebook gains and the fixed codebook gains can be carried out, for example, by the below technique described in Non Patent Literature 1. Since the below technique described in Non Patent Literature 1 does not use the interframe prediction as used in gain encoding of AMR-WB, it can enhance packet loss resistance.

For example, the gain decoder 125 acquires the fixed codebook gain in accordance with the below processing flow.

First, the gain decoder 125 calculates the power of the fixed codebook vector. Here, the length of the subframe is defined as $N_s$.

$$E_c = 10\log\left(\frac{1}{N_s}\sum_{i=0}^{N_s-1} c^2(i)\right)$$  [Mathematical Equation 21]

Next, the gain decoder 125 decodes the vector-quantized gain parameter to acquire the adaptive codebook gain $$\hat{g}_p$$  [Mathematical Equation 22]

and the quantized fixed codebook gain $$\hat{E}_i.$$  [Mathematical Equation 23]

It then calculates a predictive fixed codebook gain as described below from the quantized fixed codebook gain and the aforementioned power of the fixed codebook vector.

$$g'_c = 10^{0.05(\hat{E}_i - E_c)}$$  [Mathematical Equation 24]

Finally, the gain decoder 125 decodes the prediction coefficient $$\hat{y}$$  [Mathematical Equation 25]

and multiplies it to the prediction gain to acquire the fixed codebook gain.

$$\hat{g}_c = \hat{y} \cdot g'_c$$  [Mathematical Equation 26]

The excitation vector synthesizer 126 multiplies the adaptive codebook vector by the adaptive codebook gain and multiplies the fixed codebook vector by the fixed codebook gain and calculates a sum of them to acquire an excitation signal, as expressed by the following equation.

$$e^j(n) = g_p^j \cdot v^j(n) + g_c^j \cdot c^j(n)$$  [Mathematical Equation 27]

The post-filter 127 subjects the excitation signal vectors, for example, to post-processes such as processes of pitch enhancement, noise enhancement, and low-frequency enhancement. The pitch enhancement, the noise enhancement, and the low-frequency enhancement can be effected by use of the techniques described in Non Patent Literature 1.

The synthesis filter 128 synthesizes a decoded signal with the excitation signal as a drive audio source, by linear prediction inverse filtering.

$$\hat{s}(n) = e^j(n) - \sum_{i=1}^{P} \hat{a}_i^j \cdot \hat{s}(n-i)$$  [Mathematical Equation 28]

If a pre-emphasis is done in the encoder, a de-emphasis is carried out.

$$\hat{s}_{de-emph}(n) = \hat{s}(n) + \beta \cdot \hat{s}(n-1)$$  [Mathematical Equation 29]

On the other hand, if a pre-emphasis is not done in the encoder, a de-emphasis is not carried out.

The paragraphs below will describe the operation concerning an internal state update.

In order to interpolate parameter upon an occurrence of packet loss, the LP coefficient calculator 122 updates the internal states of the ISF parameters by vectors calculated by the following equation.

$$\bar{\omega}_i = \beta \omega_i^C + (1-\beta)\frac{\omega_i^{(-3)} + \omega_i^{(-2)} + \omega_i^{(-1)}}{3}$$  [Mathematical Equation 30]

Here, $\omega_i^{(-j)}$ represents the ISF parameters j frames prior, which are stored in the buffer. $\omega_i^C$ represents the ISF parameters in speech intervals obtained in advance by learning or the like. $\beta$ is a constant and can be a value of, e.g., 0.75, to which the value is not necessarily limited. $\omega_i^C$ and $\beta$ may be varied by an index to express a property of an encoding target frame, for example, as in the ISF concealment described in Non Patent Literature 1.

Furthermore, the LP coefficient calculator 122 also updates the internal states of the ISF residual parameters in accordance with the following equation.

$$\hat{r}_i^{-1} = \hat{r}_i^0$$  [Mathematical Equation 31]

The excitation vector synthesizer 126 updates the internal states by the excitation signal vectors in accordance with the below equation.

$$u(n) = u(n+L)(0 \leq n < N-L)$$

$$u(n+N-L+jL') = e^j(n)(0 \leq n < L')$$  [Mathematical Equation 32]

Furthermore, the excitation vector synthesizer 126 updates the internal states of the gain parameters by the following equation.

$$g_c^{(-M_{la}+j)} = g_c^j$$  [Mathematical Equation 33]

The adaptive codebook calculator 123 updates the internal states of the parameters of the pitch lags by the following equation.

$$T_p^{(-M_{la}+j)} = T_p^j$$  [Mathematical Equation 34]

The range of j is defined as $(-2 \leq j < M_{la})$ but different values may be selected as the range of j, depending upon the design principle.

<Case of Packet Loss>

FIG. 6 shows an exemplary functional configuration of the concealment signal generator 13. As shown in this FIG. 6, the concealment signal generator 13 has an LP coefficient interpolator 130, a pitch lag interpolator 131, a gain interpolator 132, a noise signal generator 133, a post-filter 134, a synthesis filter 135, an adaptive codebook calculator 136, and an excitation vector synthesizer 137. It should be noted, however, that the post-filter 134 is not an indispensable constitutive element.

The LP coefficient interpolator 130 calculates $$\dot{\omega}_i \quad \text{[Mathematical Equation 35]}$$

by the following equation. In this respect, $\omega_i^{(-j)}$ represents the ISF parameters j frames prior, which are stored in the buffer.

$$\omega_i = \alpha \omega_i^{(-1)} + (1-\alpha)\vec{\omega}_i \quad \text{[Mathematical Equation 36]}$$

In this equation, $$\vec{\omega}_i \quad \text{[Mathematical Equation 37]}$$

represents the internal states of the ISF parameters calculated upon normal reception of a packet. α is also a constant and can be a value of, e.g., 0.9 to which the value is not necessarily limited. α may be varied by an index to express a property of an encoding target frame, for example, as in the ISF concealment described in Non Patent Literature 1.

The procedure of obtaining the LP coefficients from the ISF parameters is the same as performed in the case of normal reception of a packet.

The pitch lag interpolator 131 uses the internal state parameters about the pitch lags $$T_p^{(-Mla+j)} \quad \text{[Mathematical Equation 38]}$$

to calculate predictive values of the pitch lags $$\hat{T}_p. \quad \text{[Mathematical Equation 39]}$$

A specific processing procedure to be used can be the technique disclosed in Non Patent Literature 1.

In order to interpolate the fixed codebook gains, the gain interpolator 132 can use the technique according to the below equation as described in Non Patent Literature 1.

$$g_s = 0.4 \cdot g_c^{-1} + 0.3 \cdot g_c^{-2} + 0.2 \cdot g_c^{-3} + 0.1 \cdot g_c^{-4} \quad \text{[Mathematical Equation 40]}$$

The noise signal generator 133 generates white noise for the same length as the fixed codebook vectors and uses the resultant noise for the fixed codebook vectors.

The operations of the post-filter 134, the synthesis filter 135, the adaptive codebook calculator 136, and the excitation vector synthesizer 137 are the same as those in the aforementioned case of normal reception of a packet.

The internal state update is the same as performed in the case of normal reception of a packet, except for an update of the ISF residual parameters. The updating of the ISF parameters is carried out in accordance with the following equation by the LP coefficient interpolator 130.

$$\dot{r}_i^0 = \dot{\omega}_i^0 - \text{mean}_i - \frac{1}{3} \dot{r}_i^{-1} \quad \text{[Mathematical Equation 41]}$$

CITATION LIST

Patent Literatures

Patent Literature 1: International Publication WO 2002/035520
Patent Literature 2: International Publication WO 2008/108080

Non Patent Literature

Non Patent Literature 1: ITU-T Recommendation G.718, June 2008

SUMMARY OF INVENTION

Technical Problem

As described above, since the CELP encoding involves the internal states, a degradation of audio quality occurs because of a deviation between the parameters obtained by interpolations implemented upon a packet loss and the parameters that would have been used for decoding. Particularly, as to the ISF parameters, intraframe/interframe predictive encoding is carried out, and thus there is the problem that an influence by a packet loss continues even after recovery from the packet loss.

More specifically, a problem of a sudden increase of power is identified in the first frame after recovery from a packet loss occurring in the vicinity of an audio start portion. This is caused for the following reason: That is, in the audio start portion where the power of the excitation signal becomes high, the impulse response of the LP coefficients calculated from the ISF coefficients obtained by the interpolation process upon a packet loss has a higher gain than the one that would have been originally expected for the decoder. This is perceived, according to the subjective quality standard, as an unpleasant discontinuity of audio.

The method described in Patent Literature 1 generates the interpolated ISF coefficients for a lost frame. However, since the ISF parameters are generated by a normal decoding process for the first frame after recovery from the loss, it fails to suppress the sudden increase of power.

On the other hand, the method described in Patent Literature 2 transmits a gain adjustment parameter (normalized prediction residual power) obtained on the encoding side and uses it for a power adjustment on the decoding side, thereby controlling the power of the excitation signal of a lost packet frame and enabling prevention of the sudden increase of power.

FIG. 7 shows an exemplary functional configuration of an audio decoder 1X implemented by the technology of Patent Literature 2, and FIG. 8 shows an exemplary functional configuration of a concealment signal generator 13X. In Patent Literature 2, an audio packet includes auxiliary information of at least a normalized prediction residual power in addition to the parameters described in the conventional technique.

A normalized prediction residual power decoder 15 provided in the audio signal generator 1X decodes the auxiliary information of the normalized prediction residual power from a received audio packet to calculate a reference normalized prediction residual power, and outputs it to the concealment signal generator 13X.

Since the constitutive elements of the concealment signal generator 13X, other than normalized prediction residual adjuster 138, are the same as those in the aforementioned conventional technology, only the normalized prediction residual adjuster 138 will be described below.

The normalized prediction residual adjuster 138 calculates the normalized prediction residual power from the LP coefficients output by the LP coefficient interpolator 130. Next, the normalized prediction residual adjuster 138 calculates a synthesis filter gain adjustment coefficient, using the normalized prediction residual power and the reference normalized prediction residual power. Finally, the normalized prediction residual adjuster 138 multiplies the excitation signal by the synthesis filter gain adjustment coefficient and output the result to the synthesis filter 135.

The above-described technology of Patent Literature 2 can control the power of the concealment signal upon an occurrence of a packet loss in the same manner as performed in the normal reception. However, it is difficult to secure a bit rate necessary for transmission of the foregoing gain adjustment parameter in the process of low-bit-rate audio encoding. In addition, since it is the processing in the concealment signal generator, it is difficult to deal with a sudden change of power caused by a disagreement of the ISF parameters in a recovery frame.

An object of the present invention is therefore to reduce a discontinuity of audio which can occur upon recovery from a packet loss at the audio start point, and thereby improve the subjective quality.

Solution to Problem

An audio signal processing device according to one embodiment of the present invention comprises: a discontinuity detector configured to determine an occurrence of a discontinuity occurring with a sudden increase of the amplitude of a decoded audio obtained by decoding a first audio packet which is received correctly after an occurrence of a packet loss; and a discontinuity corrector configured to correct the discontinuity of the decoded audio.

The discontinuity detector may determine an occurrence of a discontinuity of the decoded audio with the power of an excitation signal.

The discontinuity detector may detect an occurrence of a discontinuity of the decoded audio with quantized codebook gains used for calculation of an excitation signal.

The audio signal processing device may further comprise: an auxiliary information decoder configured to decode auxiliary information for determination on an occurrence of a discontinuity transmitted from an encoder, and the discontinuity detector may determine an occurrence of a discontinuity of the decoded audio, using the auxiliary information decoded and output as an auxiliary information code by the auxiliary information decoder.

The discontinuity corrector may correct ISF parameters or LSF parameters (hereinafter referred to as "ISF/LSF parameters") according to a result of determination on an occurrence of a discontinuity.

More specifically, the discontinuity corrector may change a distance between elements of the ISF/LSF parameters given for ensuring stability of a synthesis filter, according to a result of determination on an occurrence of a discontinuity.

At this time, the discontinuity corrector may extend the distance between the elements of the ISF/LSF parameters given for ensuring the stability of the synthesis filter to become larger than an ordinary distance given for ensuring stability.

For the distance between the elements of the ISF/LSF parameters given for ensuring the stability of the synthesis filter, the discontinuity corrector may use a distance, which is obtained by equally dividing the ISF/LSF parameters into those of a predetermined length.

Furthermore, the discontinuity corrector may replace a part of or all of the ISF/LSF parameters with predetermined vectors.

An audio signal processing device according to one embodiment of the present invention comprises: an ISF/LSF quantizer configured to quantize ISF/LSF parameters; an ISF/LSF concealer configured to generate concealment ISF/LSF parameters, which are concealment information for the ISF/LSF parameters; a discontinuity detector configured to determine an occurrence of a discontinuity occurring in a first audio packet which is received correctly after an occurrence of a packet loss, using distances between the quantized ISF/LSF parameters obtained in the quantization process by the ISF/LSF quantizer and the concealment ISF/LSF parameters generated by the ISF/LSF concealer; and an auxiliary information encoder configured to encode auxiliary information for determination on an occurrence of a discontinuity.

An audio signal processing device according to one embodiment of the present invention comprises: a discontinuity detector configured to determine an occurrence of a discontinuity occurring in a first audio packet which is received correctly after an occurrence of a packet loss; an auxiliary information encoder configured to encode auxiliary information for determination on an occurrence of a discontinuity; and an ISF/LSF quantizer configured to use past quantized ISF/LSF residual parameters for ISF/LSF quantization in a given frame when the discontinuity detector does not determine an occurrence of a discontinuity, and avoid using the past quantized ISF/LSF residual parameters for ISF/LSF quantization in the given frame when the discontinuity detector determines an occurrence of a discontinuity.

An audio signal processing device according to one embodiment of the present invention comprises: an auxiliary information decoder configured to decode and output auxiliary information for determination on an occurrence of a discontinuity occurring in a first audio packet which is received correctly after an occurrence of a packet loss; a discontinuity corrector configured to correct the discontinuity of a decoded audio; and an ISF/LSF decoder configured to use past quantized ISF/LSF residual parameters for ISF/LSF calculation in a pertinent frame when the auxiliary information from the auxiliary information decoder does not indicate an occurrence of a discontinuity, and avoid using the past quantized ISF/LSF residual parameters for the ISF/LSF calculation in the pertinent frame when the auxiliary information from the auxiliary information decoder indicates an occurrence of a discontinuity.

The audio signal processing device may adopt a configuration in which the audio signal processing device further comprises: a reception state determiner configured to determine packet reception states of a predetermined number of past frames; the discontinuity corrector corrects a discontinuity on the basis of a determination result of the packet reception states as well, in addition to a result of determination on an occurrence of a discontinuity.

Now, the audio signal processing device according to one embodiment of the present invention may be taken as an invention associated with an audio signal processing method, and as an invention associated with an audio signal processing program, and can be described as below.

An audio signal processing method according to one embodiment of the present invention is an audio signal processing method to be executed by an audio signal processing device, comprising: a step of determining an occurrence of a discontinuity of decoded audio occurring with a sudden increase of the amplitude of a decoded audio obtained by decoding a first audio packet which is received correctly after an occurrence of a packet loss; and a step of correcting the discontinuity of the decoded audio.

An audio signal processing method according to one embodiment of the present invention is an audio signal processing method to be executed by an audio signal processing device, comprising: a step of quantizing ISF/LSF parameters; a step of generating concealment ISF/LSF parameters which are concealment information for the ISF/LSF parameters; a step of determining an occurrence of a discontinuity occurring in a first audio packet which is received correctly after an occurrence of a packet loss, using distances between quantized ISF/LSF parameters obtained in a quantization process of the ISF/LSF quantizer and the generated concealment ISF/LSF parameters; and a step of encoding auxiliary information for determination on an occurrence of a discontinuity.

An audio signal processing method according to one embodiment of the present invention is an audio signal processing method to be executed by an audio signal processing device, comprising: a step of determining an occurrence of a discontinuity occurring in a first audio packet which is received correctly after an occurrence of a packet loss; a step of encoding auxiliary information for determination on an occurrence of a discontinuity; and a step of using past quantized ISF/LSF residual parameters for ISF/LSF quantization in a given frame when an occurrence of a discontinuity is not determined, and avoiding using the past quantized ISF/LSF residual parameters for the ISF/LSF quantization in the pertinent frame when an occurrence of a discontinuity is determined.

An audio signal processing method according to one embodiment of the present invention is an audio signal processing method to be executed by an audio signal processing device, comprising: a step of decoding and outputting auxiliary information for determination on an occurrence of a discontinuity of decoded audio occurring in a first audio packet which is received correctly after an occurrence of a packet loss; a step of correcting the discontinuity of decoded audio; and a step of using past quantized ISF/LSF residual parameters for ISF/LSF calculation in a given frame when the auxiliary information does not indicate an occurrence of a discontinuity, and avoiding using the past quantized ISF/LSF residual parameters for the ISF/LSF calculation in the given frame when the auxiliary information indicates an occurrence of a discontinuity.

An audio signal processing program according to one embodiment of the present invention is an audio signal processing program that programs a computer to operate as: a discontinuity detector operable to determine an occurrence of a discontinuity of decoded audio occurring with a sudden increase of amplitude of a decoded audio obtained by decoding a first audio packet which is received correctly after an occurrence of a packet loss; and a discontinuity corrector operable to correct the discontinuity of the decoded audio.

An audio signal processing program according to one embodiment of the present invention is an audio signal processing program that programs a computer to operate as: an ISF/LSF quantizer operable to quantize ISF/LSF parameters; an ISF/LSF concealer operable to generate concealment ISF/LSF parameters which are concealment information for the ISF/LSF parameters; a discontinuity detector operable to determine an occurrence of a discontinuity occurring in a first audio packet which is received correctly after an occurrence of a packet loss, using distances between quantized ISF/LSF parameters obtained in a quantization process of the ISF/LSF quantizer and the concealment ISF/LSF parameters generated by the ISF/LSF concealer; and an auxiliary information encoder operable to encode auxiliary information for determination on an occurrence of a discontinuity.

An audio signal processing program according to one embodiment of the present invention is an audio signal processing program that programs a computer to operate as: a discontinuity detector operable to determine an occurrence of a discontinuity occurring in a first audio packet which is received correctly after an occurrence of a packet loss; an auxiliary information encoder operable to encode auxiliary information for determination on an occurrence of a discontinuity; and an ISF/LSF quantizer operable to use past quantized ISF/LSF residual parameters for ISF/LSF quantization in a pertinent frame when the discontinuity detector does not determine an occurrence of a discontinuity, and avoid using the past quantized ISF/LSF residual parameters for the ISF/LSF quantization in the pertinent frame when the discontinuity detector determines an occurrence of a discontinuity.

An audio signal processing program according to one embodiment of the present invention is an audio signal processing program that programs a computer to operate as: an auxiliary information decoder operable to decode and output auxiliary information for determination on an occurrence of a discontinuity of decoded audio occurring in a first audio packet which is received correctly after an occurrence of a packet loss; a discontinuity corrector operable to correct the discontinuity of decoded audio; and an ISF/LSF decoder operable to use past quantized ISF/LSF residual parameters for ISF/LSF calculation in a given frame when the auxiliary information from the auxiliary information decoder does not indicate an occurrence of a discontinuity, and avoid using the past quantized ISF/LSF residual parameters for the ISF/LSF calculation in the pertinent frame when the auxiliary information from the auxiliary information decoder indicates an occurrence of a discontinuity.

Advantageous Effect of Invention

The present invention as described above can reduce a discontinuity of audio possibly occurring subsequent to recovery from a packet loss at the audio start point and thus improve the subjective quality.

DETAILED DESCRIPTION OF THE PREFERRED EMBODIMENTS

Preferred embodiments of an audio signal processing device, an audio signal processing method, and an audio signal processing program according to the present invention will be described below in detail using the drawings. The same elements will be denoted by similar reference signs in the description of the drawings to avoid duplicate descriptions.

First Embodiment

Figure 1:
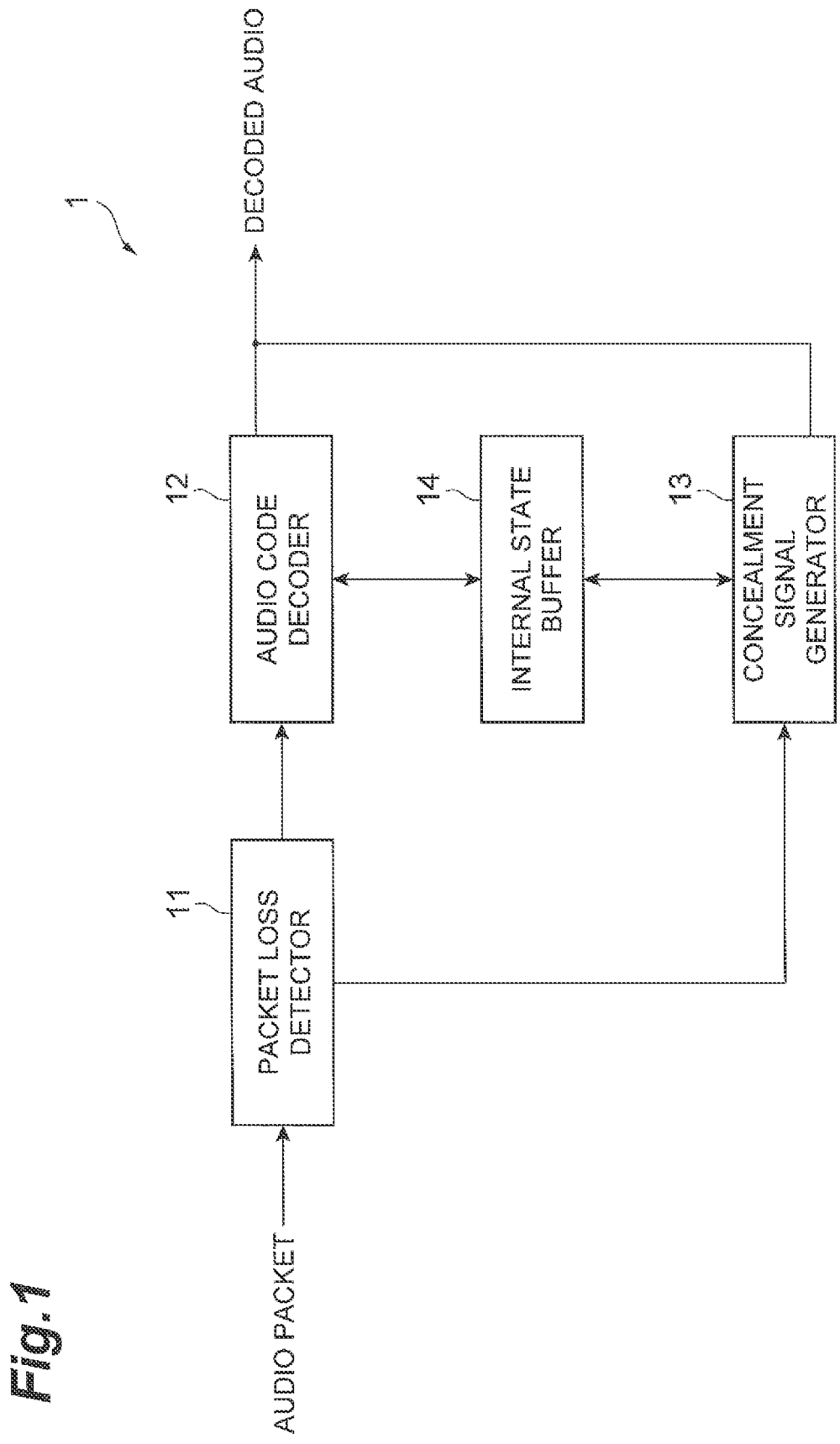
FIG. 1 is a configuration diagram of the audio decoder.
Figure 2:
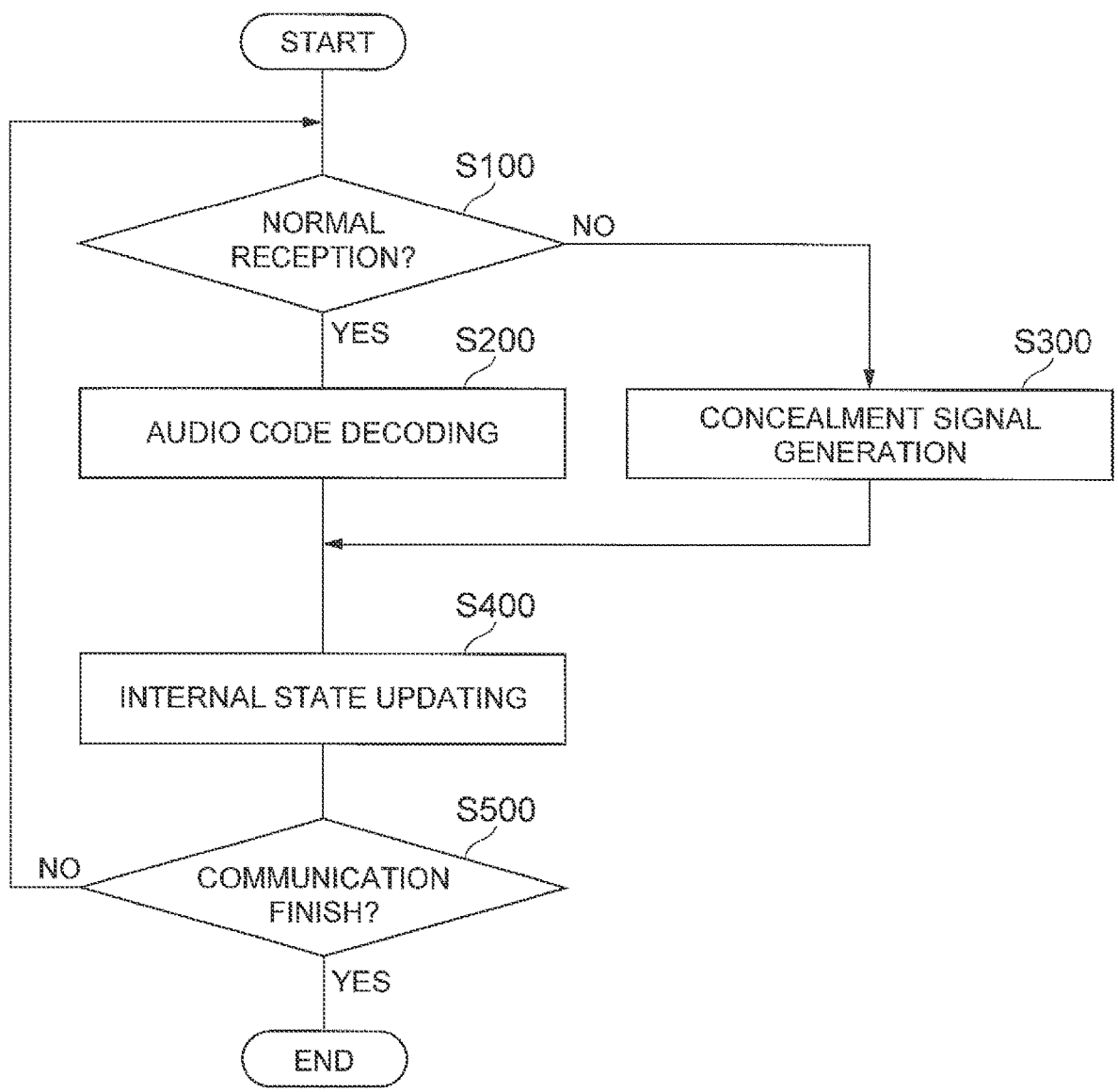
FIG. 2 is a processing flow of the audio decoder.

The audio signal processing device in the first embodiment has the same configuration as the aforementioned audio decoder 1 shown in FIG. 1 and has a novel feature in the audio code decoder, and thus the audio code decoder will be described below.

Figure 3:
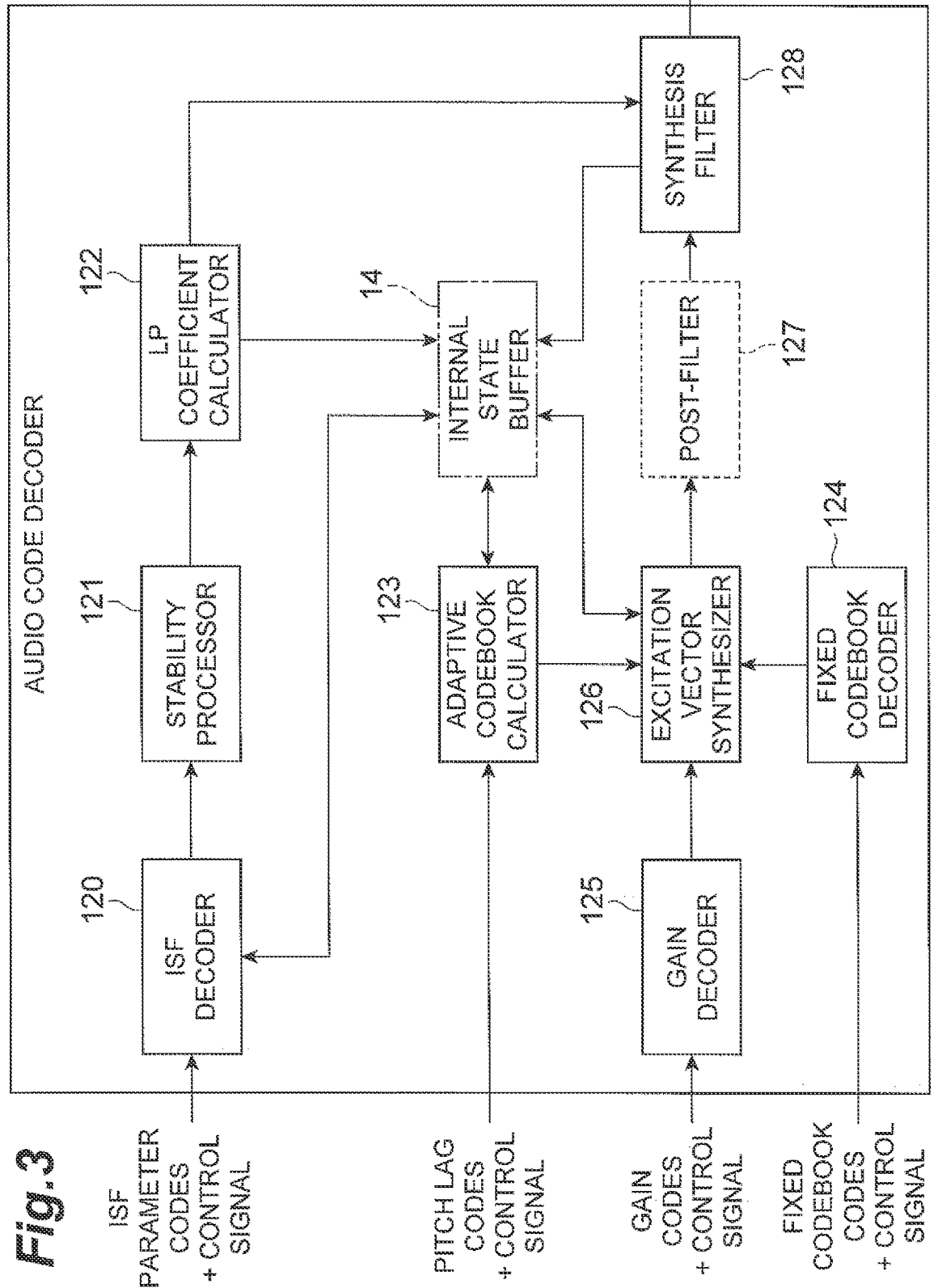
FIG. 3 is a functional configuration diagram of the audio code decoder.
Figure 4:
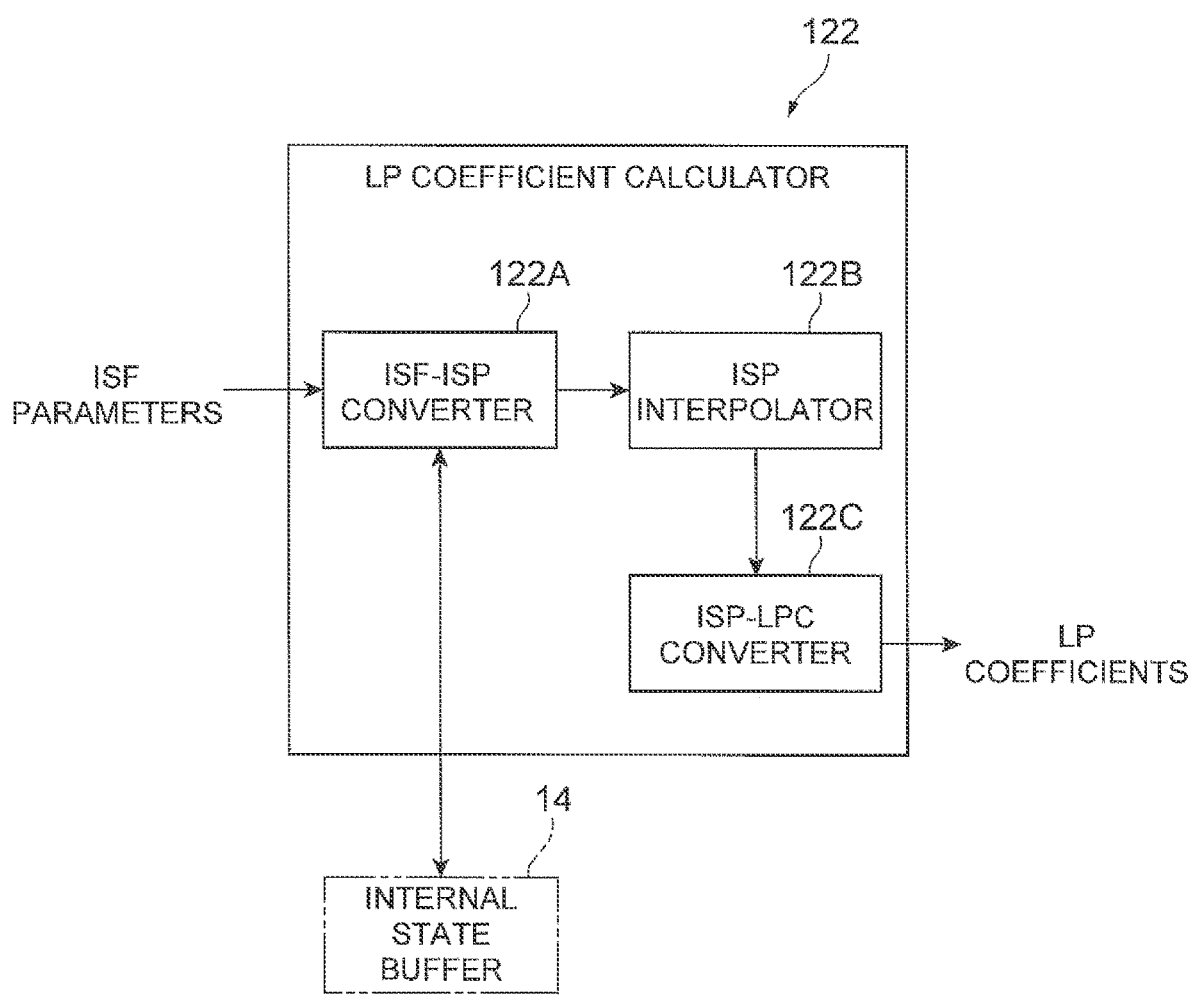
FIG. 4 is a functional configuration diagram of the LP coefficient calculator.
Figure 5:
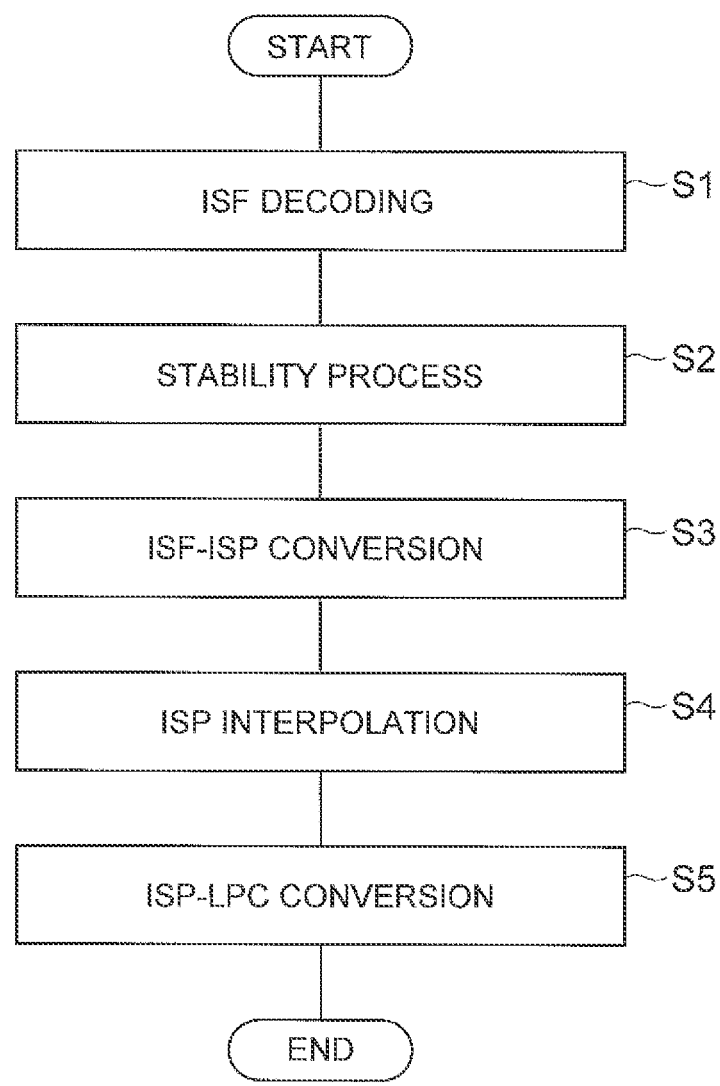
FIG. 5 is a processing flow of calculating the LP coefficients.
Figure 9:
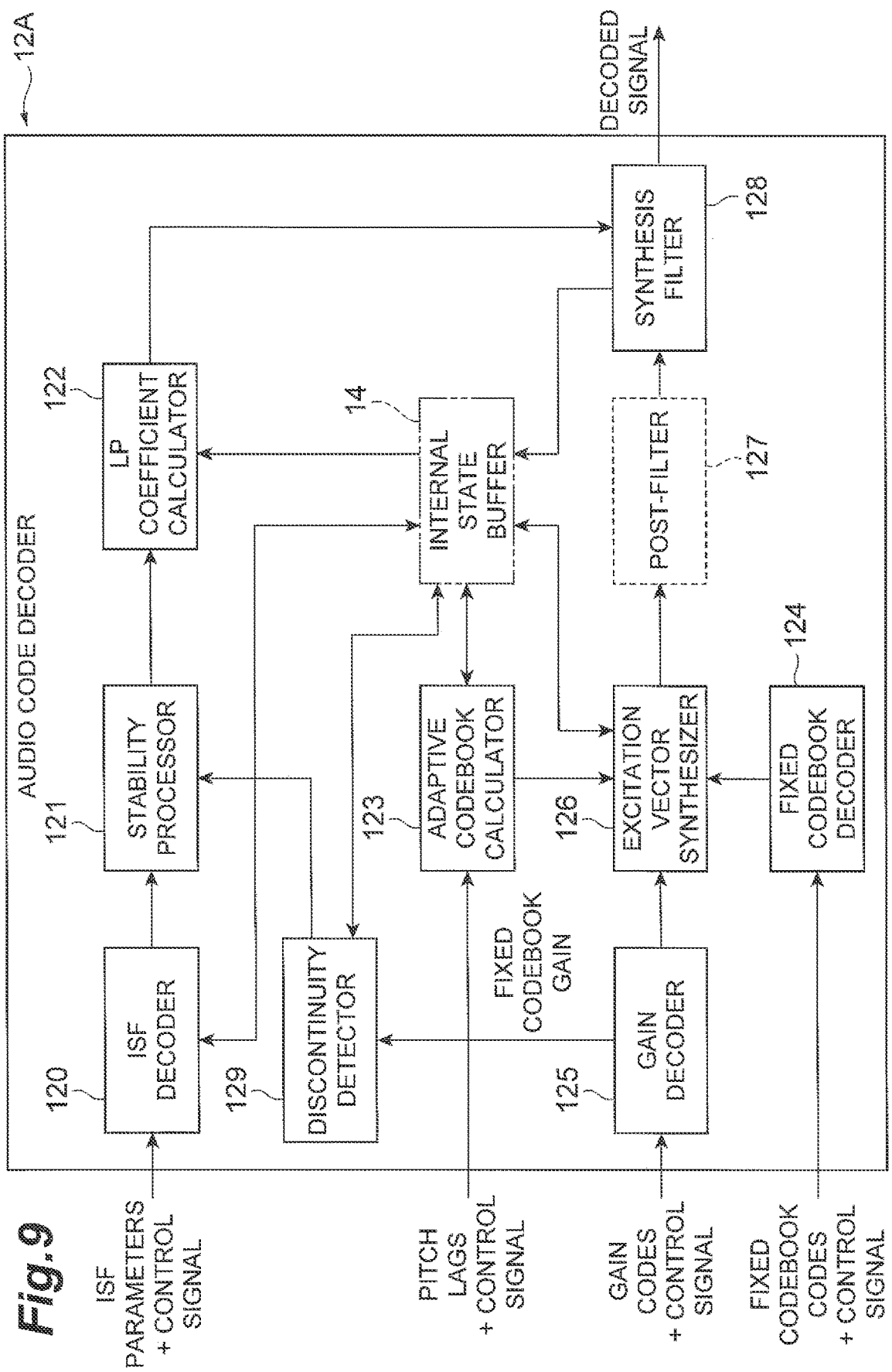
FIG. 9 is a functional configuration diagram of the audio code decoder in a first embodiment.
Figure 10:
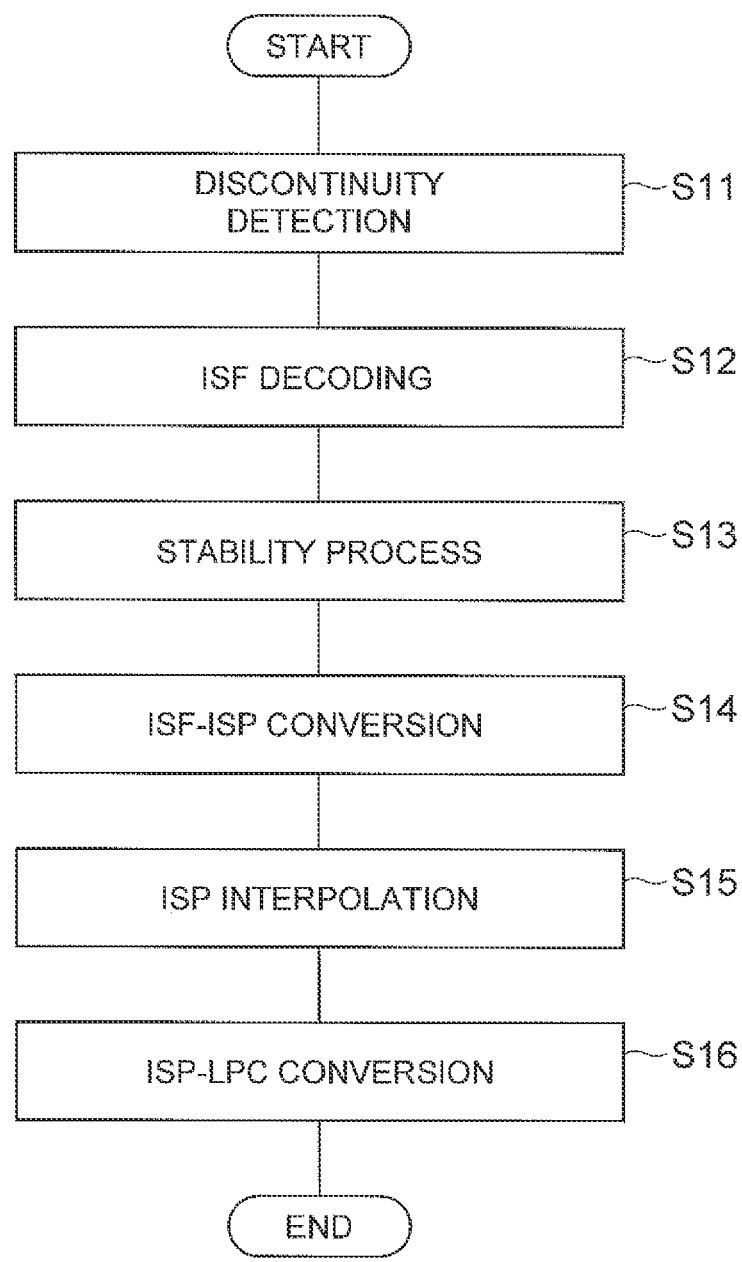
FIG. 10 is a processing flow of the LP coefficient calculator in the first embodiment.

FIG. 9 is a diagram showing a functional configuration of an audio code decoder 12A in the first embodiment, and FIG. 10 shows a flowchart of the LP coefficient calculation process. The audio code decoder 12A shown in FIG. 9 is configured by adding a discontinuity detector 129 to the aforementioned configuration of FIG. 3. Since the present embodiment differs from the conventional technology only in the LP coefficient calculation process, the operations of respective parts associated with the LP coefficient calculation process will be described below.

A discontinuity detector 129 refers to a fixed codebook gain $g_c^0$ acquired by decoding and a fixed codebook gain $g_c^{-1}$ included in the internal states and compares a change of the gain with a threshold in accordance with the following equation (step S11 in FIG. 10).

$$\log(g_c^0) - \log(g_c^{-1}) > \text{Thres} \quad \text{[Mathematical Equation 42]}$$

When the gain change exceeds the threshold, the detector detects an occurrence of a discontinuity (also referred to hereinafter simply as "detects a discontinuity") and outputs a control signal indicating a detection result of a discontinuity occurrence to the stability processor 121.

The following equation may be used for the comparison between the gain change and the threshold.

$$g_c^0 - g_c^{-1} > \text{Thres} \quad \text{[Mathematical Equation 43]}$$

Furthermore, the comparison between the gain change and the threshold may be made by the following equation, where a $g_c^{(c)}$ represents the maximum among the fixed codebook gains of the first to fourth subframes included in the current frame and a $g_c^{(p)}$ represents the minimum among the fixed codebook gains included in the internal states.

$$\log(g_c^{(c)}) - \log(g_c^{(p)}) > \text{Thres} \quad \text{[Mathematical Equation 44]}$$

The flowing equation can also be used.

$$g_c^{(c)} - g_c^{(p)} > \text{Thres} \quad \text{[Mathematical Equation 45]}$$

The above example of the first embodiment shows an example in which a discontinuity detection is conducted using the fixed codebook gain $g_c^{-1}$ of the fourth subframe of the immediately preceding frame (lost frame) and the fixed codebook gain $g_c^0$ of the first subframe of the current frame. However, comparison between the gain change and the threshold may be made using averages calculated from the fixed codebook gains included in the internal states and the fixed codebook gains included in the current frame.

The ISF decoder 120 performs the same operation as in the conventional technology (step S12 in FIG. 10).

The stability processor 121 corrects the ISF parameters by the following process when the discontinuity detector 129 detects a discontinuity (step S13 in FIG. 10).

First, the stability processor 121 subjects the ISF parameters $$\dot{\omega}_i^{-1} \quad \text{[Mathematical Equation 46]}$$

stored in the internal state buffer 14 to a process of expanding a distance between two adjacent element to become $M_{-1}$ times wider than the ordinary distance. The process of placing a very wide distance than the ordinary distance provides an effect to suppress excessive peaks and dips in the spectrum envelope. Here, min_dist represents the minimum ISF distance, and isf_min represents the minimum of ISF necessary for securing the distance of min_dist. isf_min is successively updated by adding the distance of min_dist to a value of neighboring ISF. On the other hand, isf_max is the maximum of ISF necessary for securing the distance of min_dist. isf_max is successively updated by subtracting the distance of min_dist from a value of neighboring ISF.

isf_min=min_dist=50$_{-1}$ for $i$=0 to 14 if $\dot{\omega}_i$<isf_min then $\dot{\omega}_i^{-1}$=isf_min isf_min=$\dot{\omega}_i^{-1}$+min_dist isf_max=6400−min_dist if $\dot{\omega}_{14}^{-1}$>isf_max for $i$=14 down to 1 if $\dot{\omega}_i^{-1}$>isf_max then $\dot{\omega}_i^{-1}$=isf_max isf_max=$\dot{\omega}_i^{-1}$−min_dist [Mathematical Equation 47]

Next, a stability processor 121 subjects the ISF parameters of the current frame to a process of expanding a distance between two adjacent element to become $M_0$ times wider than the ordinary distance. $1<M_0<M_{-1}$ is assumed herein, but it is also possible to set one of r $M_{-1}$ and $M_0$ to 1 and the other to a value larger than 1.

isf_min=min_dist=$50_0$ for $i$=0 to 14 if $\dot{\omega}_i^0$<isf_min then $\dot{\omega}_i^0$=isf_min isf_min=$\dot{\omega}_i^0$+min_dist isf_max=6400−min_dist if $\dot{\omega}_{14}^0$>isf_max for $i$=14 down to 1 if $\dot{\omega}_i^0$>isf_max then $\dot{\omega}_i^0$=isf_max isf_max=$\dot{\omega}_i^0$−min_dist [Mathematical Equation 48]

Furthermore, the stability processor 121 performs the following process in the same manner as carried out in the ordinary decoding process, when the discontinuity detector detects no discontinuity.

isf_min=min_dist=50 for $i$=0 to 14 if $\dot{\omega}_i^0$<isf_min then $\dot{\omega}_i^0$=isf_min isf_min=$\dot{\omega}_i^0$+min_dist isf_max=6400−min_dist if $\dot{\omega}_{14}^0$>isf_max for $i$=14 down to 1 if $\dot{\omega}_i^0$>isf_max then $\dot{\omega}_i^0$=isf_max isf_max=$\dot{\omega}_i^0$−min_dist [Mathematical Equation 49]

The minimum distance placed between elements when a discontinuity is detected may be varied depending upon the frequency of ISF. The minimum distance placed between elements when a discontinuity is detected needs only to be different from the minimum distance placed between elements in the ordinary decoding process.

The ISF-ISP converter 122A in the LP coefficient calculator 122 converts the ISF parameters $\dot{\omega}_i, \dot{\omega}_i^{-1}$ [Mathematical Equation 50]

into the ISP parameters $\dot{q}_i, \dot{q}_i^{-1}$ [Mathematical Equation 51]

respectively, in accordance with the following equation (step S14 in FIG. 10). Here, C is a constant determined in advance.

$\dot{q}_i = \cos(C \cdot \dot{\omega}_i)$ [Mathematical Equation 52]

The ISP interpolator 122B calculates the ISP parameters for the respective subframes from the past ISP parameters $\dot{q}_i^{-1}$ [Mathematical Equation 53]

and the foregoing ISP parameters $\dot{q}_i$ [Mathematical Equation 54]

in accordance with the following equation (step S15 in FIG. 10). Other coefficients may be used for the interpolation.

$q_i^{(1)} = 0.75 \cdot \dot{q}_i^{-1} + 0.25 \cdot \dot{q}_i$ $q_i^{(2)} = 0.5 \cdot \dot{q}_i^{-1} + 0.5 \cdot \dot{q}_i$ $q_i^{(3)} = 0.25 \cdot \dot{q}_i^{-1} + 0.75 \cdot \dot{q}_i$ $q_i^{(4)} = \dot{q}_i$ [Mathematical Equation 55]

The ISP-LPC converter 122C converts the ISP parameters for the respective subframes into the LP coefficients $\dot{a}_i^j (0<i \leq P, 0 \leq j<4)$ [Mathematical Equation 56]

(step S16 in FIG. 10). Here, the number of subframes included in a look-ahead signal was assumed to be 4, but the number of subframes may differ depending upon the design principle. A specific conversion procedure to be used can be the processing procedure described in Non Patent Literature 1.

Furthermore, the ISF-ISP converter 122A updates the ISF parameters stored in the internal state buffer 14

$\dot{\omega}_i^{-1}$ [Mathematical Equation 57]

in accordance with the following equation.

$\dot{\omega}_i^{-1} = \dot{\omega}_i^0$ [Mathematical Equation 58]

At this time, even when a discontinuity is detected, the ISF-ISP converter 122A may carry out the below procedure to update the ISF parameters $\dot{\omega}_i^{-1}$ [Mathematical Equation 59]

stored in the internal state buffer, using the calculation result of the ISF parameters.

isf_min=min_dist=50 for $i$=0 to 14 if $\dot{\omega}_i^0$<isf_min then $\dot{\omega}_i^0$=isf_min isf_min=$\dot{\omega}_i^0$+min_dist isf_max=6400−min_dist if $\dot{\omega}_{14}^0$>isf_max for $i$=14 down to 1 if $\dot{\omega}_i^0$>isf_max then $\dot{\omega}_i^0$=isf_max isf_max=$\dot{\omega}_i^0$−min_dist [Mathematical Equation 60]

As in the above first embodiment, a discontinuity of decoded audio can be determined with the quantized codebook gains used in the calculation of the excitation signal and the ISF/LSF parameters (e.g., the distance between elements of the ISF/LSF parameters given for ensuring stability of the synthesis filter) can be corrected according to a result of the determination for a discontinuity. This reduces the discontinuity of audio which can occur upon recovery from a packet loss at the audio start point, and thereby improves the subjective quality.

[Modification Example of First Embodiment]

Figure 11:
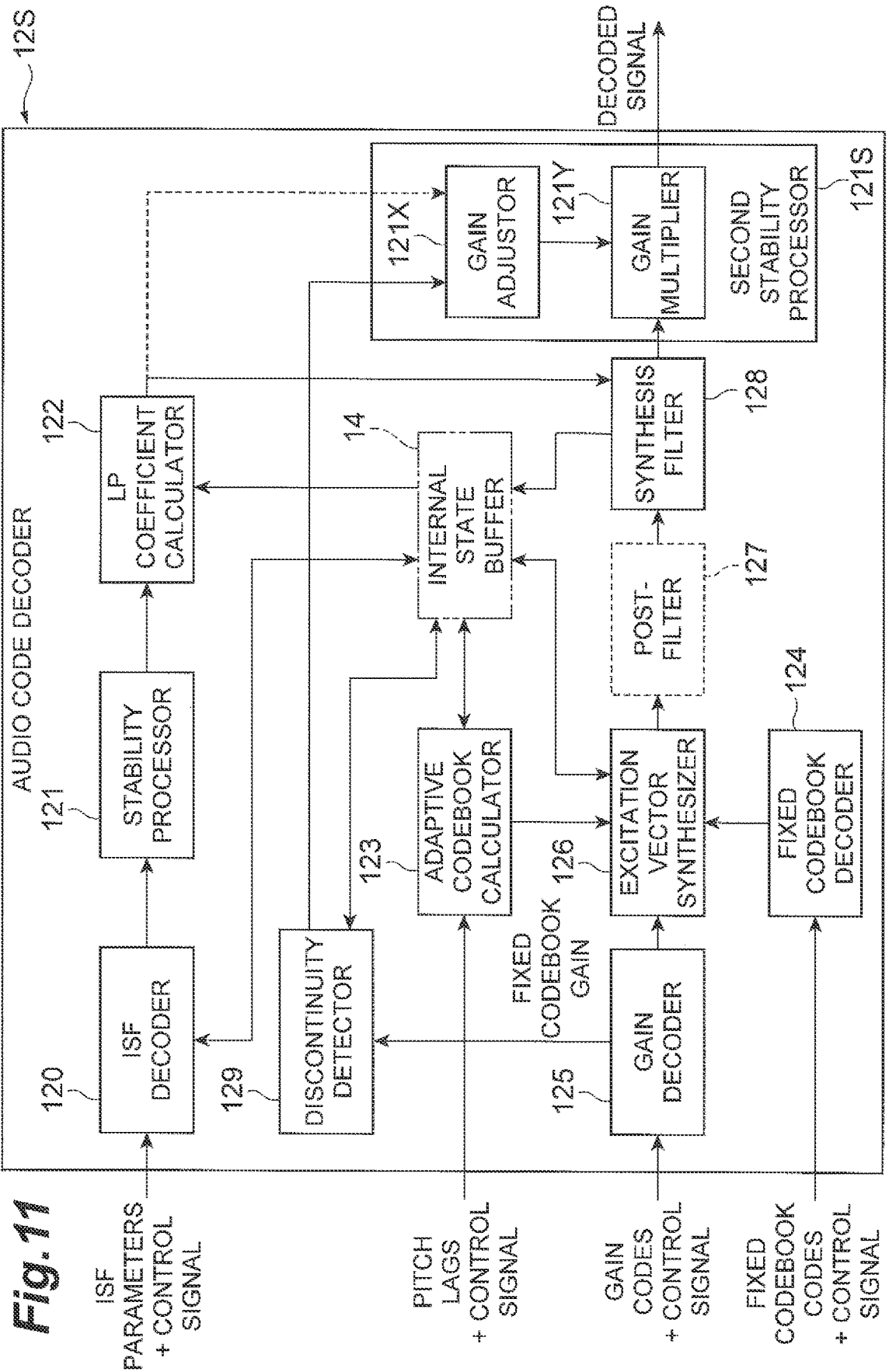
FIG. 11 is a functional configuration diagram of the audio code decoder in the first embodiment.
Figure 12:
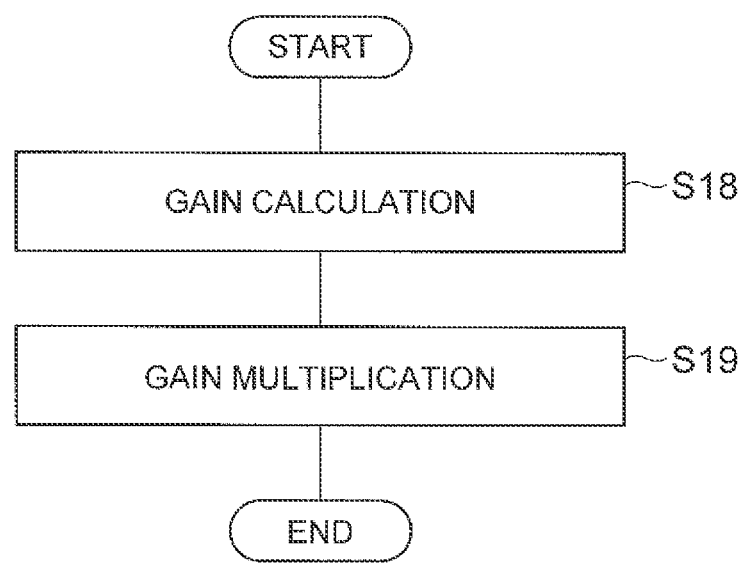
FIG. 12 is a processing flow of a second stability processor in modification example 1 of the first embodiment.

FIG. 11 is a diagram showing a functional configuration of an audio code decoder 12S according to a modification example of the first embodiment. Since it differs from the configuration of the conventional technology shown in FIG. 3 only in the discontinuity detector 129 and the second stability processor 121S, the operations of these will be described. The second stability processor 121S has a gain adjustor 121X and a gain multiplier 121Y, and a processing flow of the second stability processor 121S is shown in FIG. 12.

The discontinuity detector 129 refers to the fixed codebook gain $g_c^0$ obtained by decoding and the fixed codebook gain $g_c^{-1}$ included in the internal states and compares the gain change with a threshold, in the same manner as performed by the discontinuity detector 129 in the first embodiment. Then, the discontinuity detector 129 sends to the gain adjustor 121X, a control signal including information about whether the gain change exceeds the threshold.

The gain adjustor 121X reads from the control signal the information about whether the gain change exceeds the threshold, and, when the gain change exceeds the threshold, it outputs a predetermined gain $g_{on}$ to the gain multiplier 121Y. On the other hand, when the gain change does not exceed the threshold, the gain adjustor 121X outputs a predetermined gain $g_{off}$ to the gain multiplier 121Y. This operation of the gain adjustor 121X corresponds to step S18 in FIG. 12.

The gain multiplier 121Y multiplies the synthesized signal output from the synthesis filter 128 by the foregoing gain $g_{on}$ or gain $g_{off}$ (step S19 in FIG. 12) and outputs the resultant decoded signal.

Here, the audio code decoder may be configured such that the LP coefficient calculator 122 outputs the LP coefficients or the ISF parameters to feed them to the second stability processor 121S (as indicated by a dotted line from the LP coefficient calculator 122 to the gain adjustor 121X in FIG. 11). In this case, the gains to be multiplied are determined using the LP coefficients or the ISF parameters calculated by the LP coefficient calculator 122.

By adding the second stability processor 121S to the audio code decoder 12S and adjusting the gain, depending upon whether the gain change exceeds the threshold as described in the above modification example, an appropriate decoded signal can be obtained.

The second stability processor 121S may be configured to multiply the excitation signal by the foregoing calculated gain and output the result to the synthesis filter 128.

Second Embodiment

Figure 13:
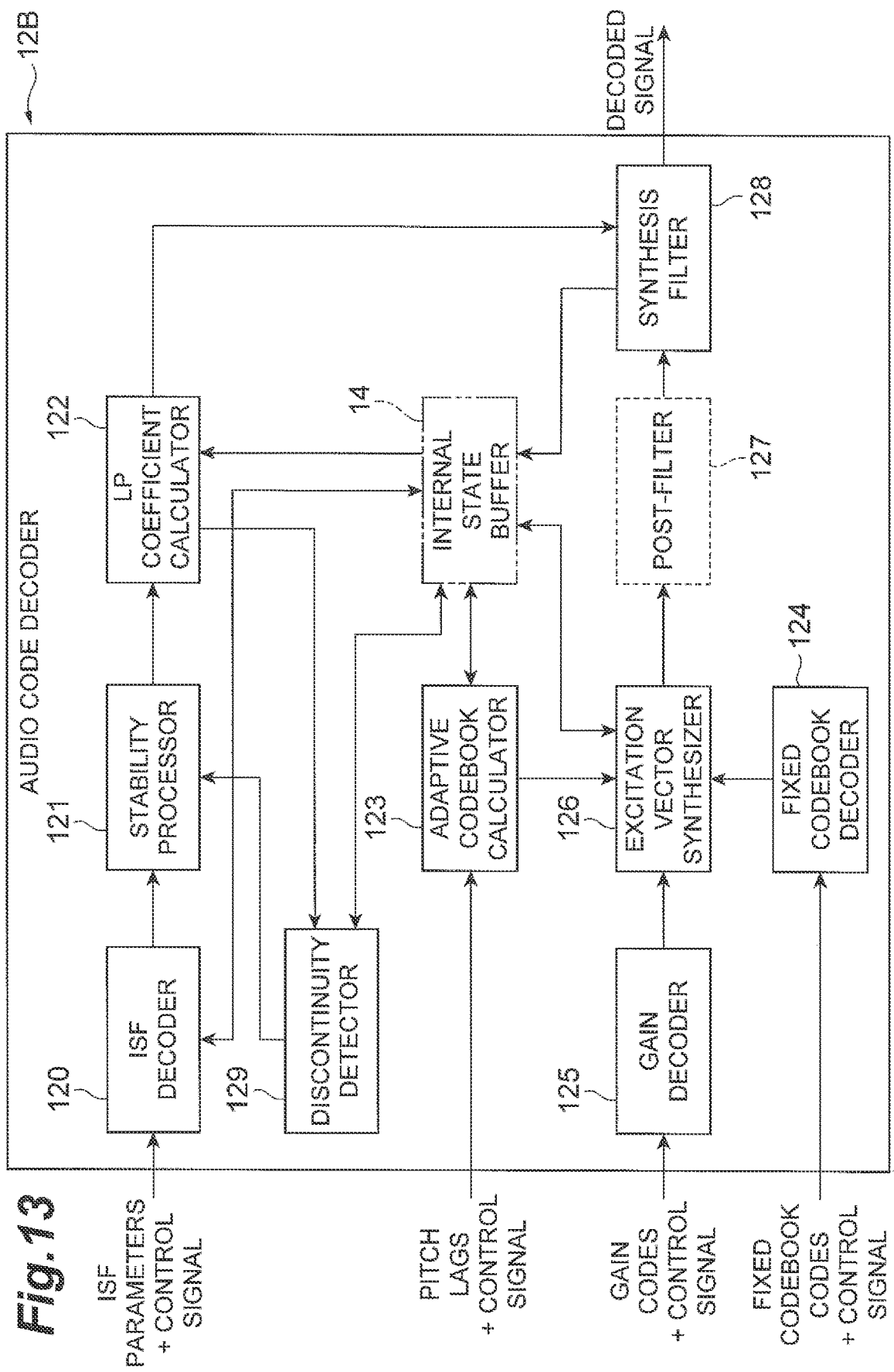
FIG. 13 is a functional configuration diagram of the audio code decoder in a second embodiment.
Figure 14:
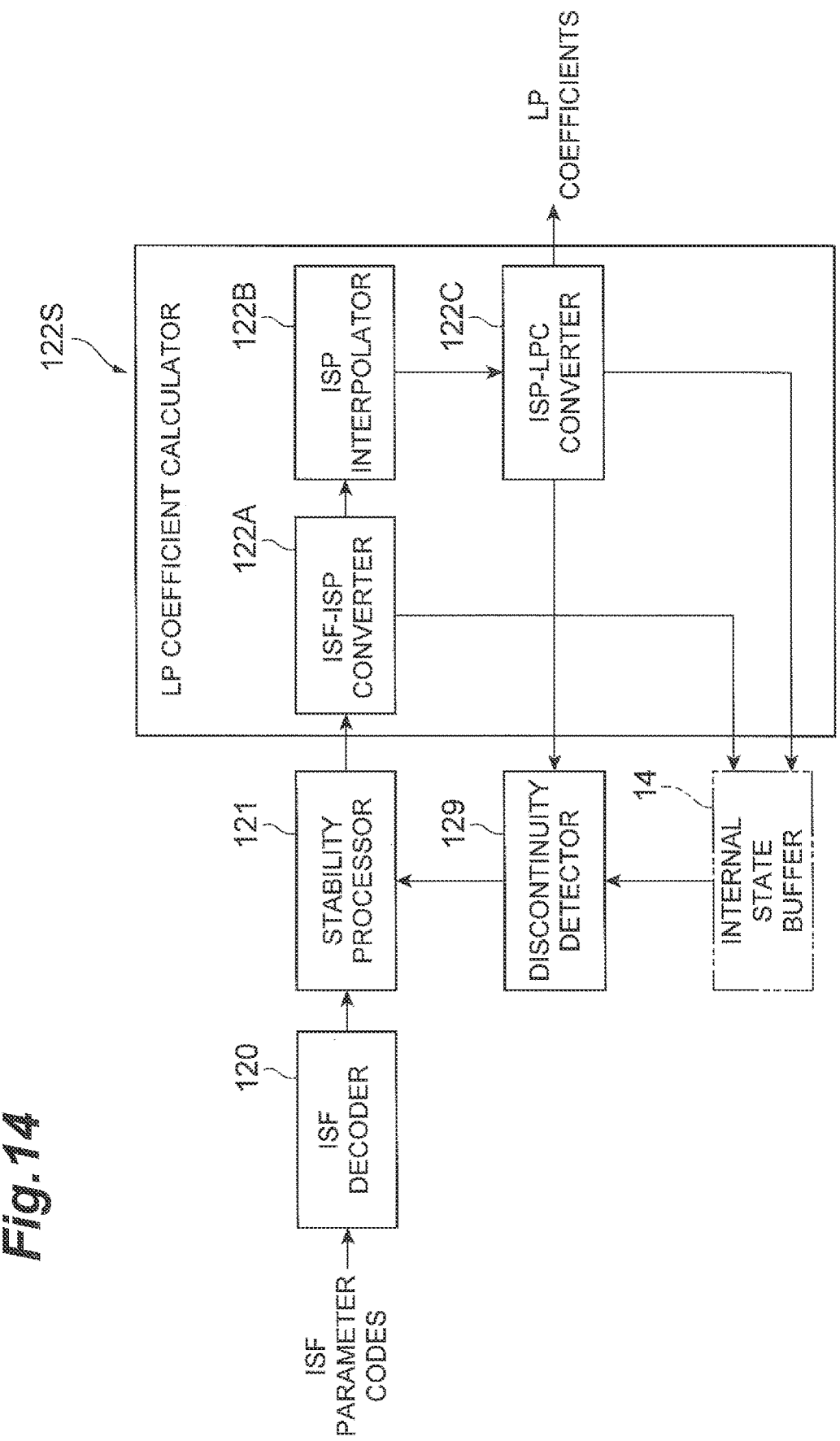
FIG. 14 is a functional configuration diagram of the LP coefficient calculator in the second embodiment.
Figure 15:
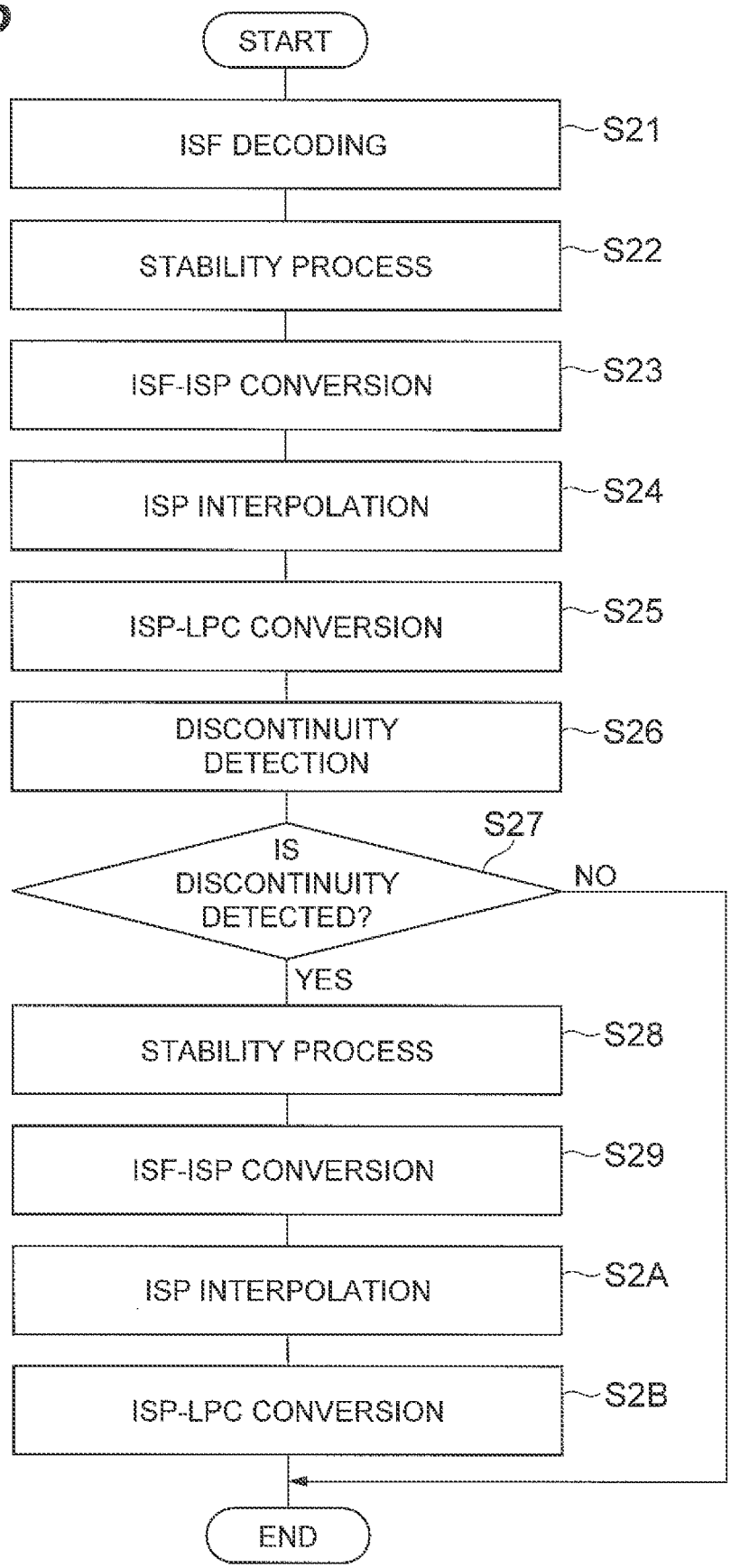
FIG. 15 is a processing flow of calculation of the LP coefficients in the second embodiment.

An audio signal processing device according to the second embodiment has the same configuration as that of the aforementioned audio decoder 1 in FIG. 1 and has a novel feature in an audio code decoder, and thus the audio code decoder will be described below. FIG. 13 shows an exemplary functional configuration of the audio code decoder 12B, FIG. 14 shows an exemplary functional configuration associated with the calculation process of the LP coefficients, and FIG. 15 shows a flow of the calculation process of the LP coefficients. The audio code decoder 12B in FIG. 13 is configured by adding the discontinuity detector 129 to the aforementioned configuration shown in FIG. 3.

The ISF decoder 120 calculates the ISF parameters in the same manner as performed in the conventional technology (step S21 in FIG. 15).

The stability processor 121 performs the process of placing a distance of not less than 50 Hz between elements of the ISF parameters $$\dot{\omega}_i \quad \text{[Mathematical Equation 61]}$$

in order to secure the stability of the filter in the same manner as performed in the conventional technology (step S22 in FIG. 15).

The ISF-ISP converter 122A converts the ISF parameters output by the stability processor 121 into the ISP parameters in the same manner as performed in the first embodiment (step S23 in FIG. 15).

The ISP interpolator 122B, in the same manner as performed in the first embodiment (step S24 in FIG. 15), calculates the ISP parameters for the respective subframes from the past ISP parameters $$\dot{q}_i^{-1} \quad \text{[Mathematical Equation 62]}$$

and the ISP parameters $$\dot{q}_i \quad \text{[Mathematical Equation 63]}$$

obtained by the conversion by the ISF-ISP converter 122A.

The ISP-LPC converter 122C, in the same manner as performed in the first embodiment (step S25 in FIG. 15), converts the ISP parameters for the respective subframes into the LP coefficients $$\dot{a}_i^j (0 \leq i \leq P, 0 \leq j < 4) \quad \text{[Mathematical Equation 64]}$$

Here, the number of subframes included in the look-ahead signal is assumed to be 4, but the number of subframes may differ depending upon the design principle.

The internal state buffer 14 updates the ISF parameters stored in the past with the new ISF parameters.

Figure 6:
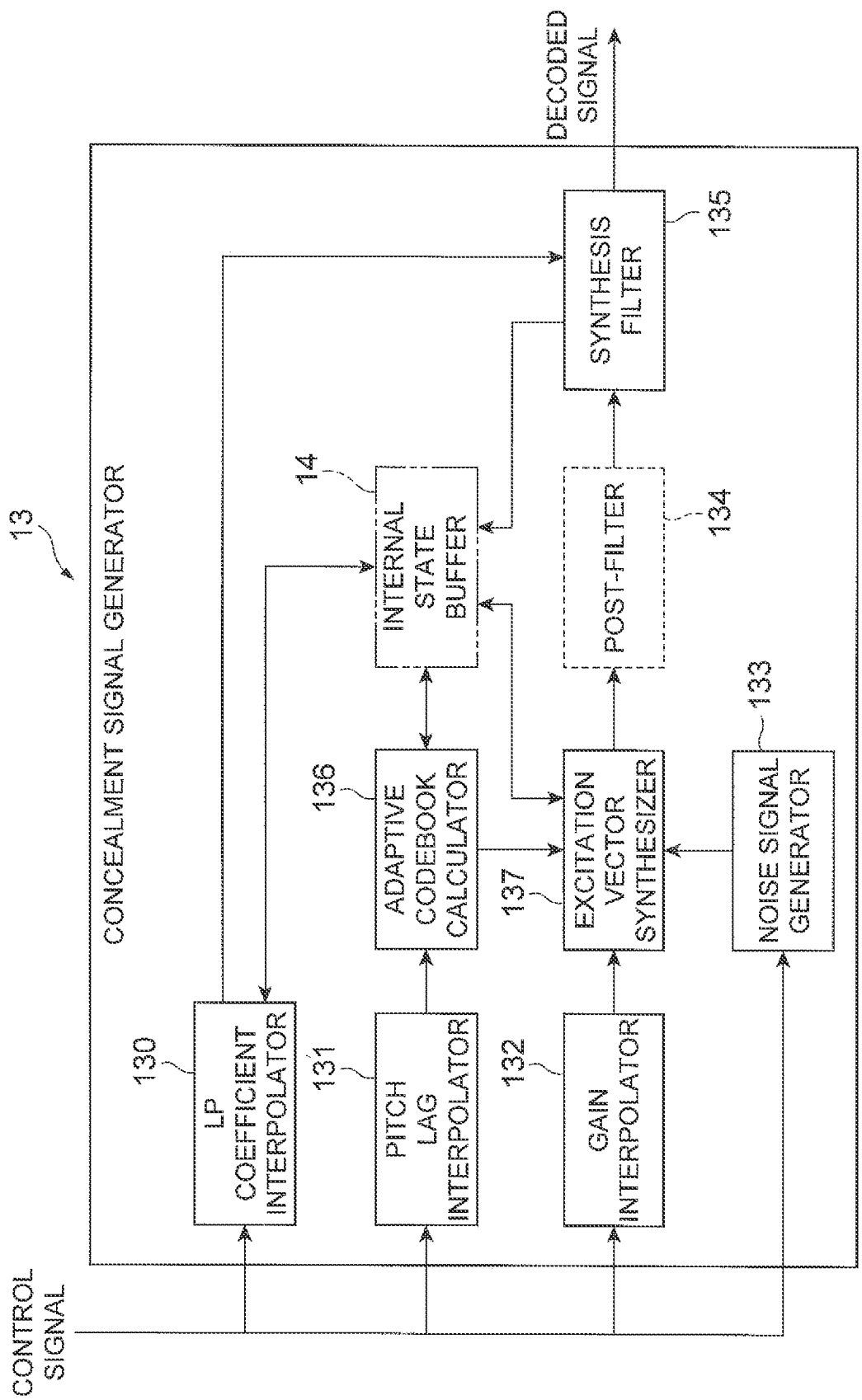
FIG. 6 is a functional configuration diagram of the concealment signal generator.
Figure 7:
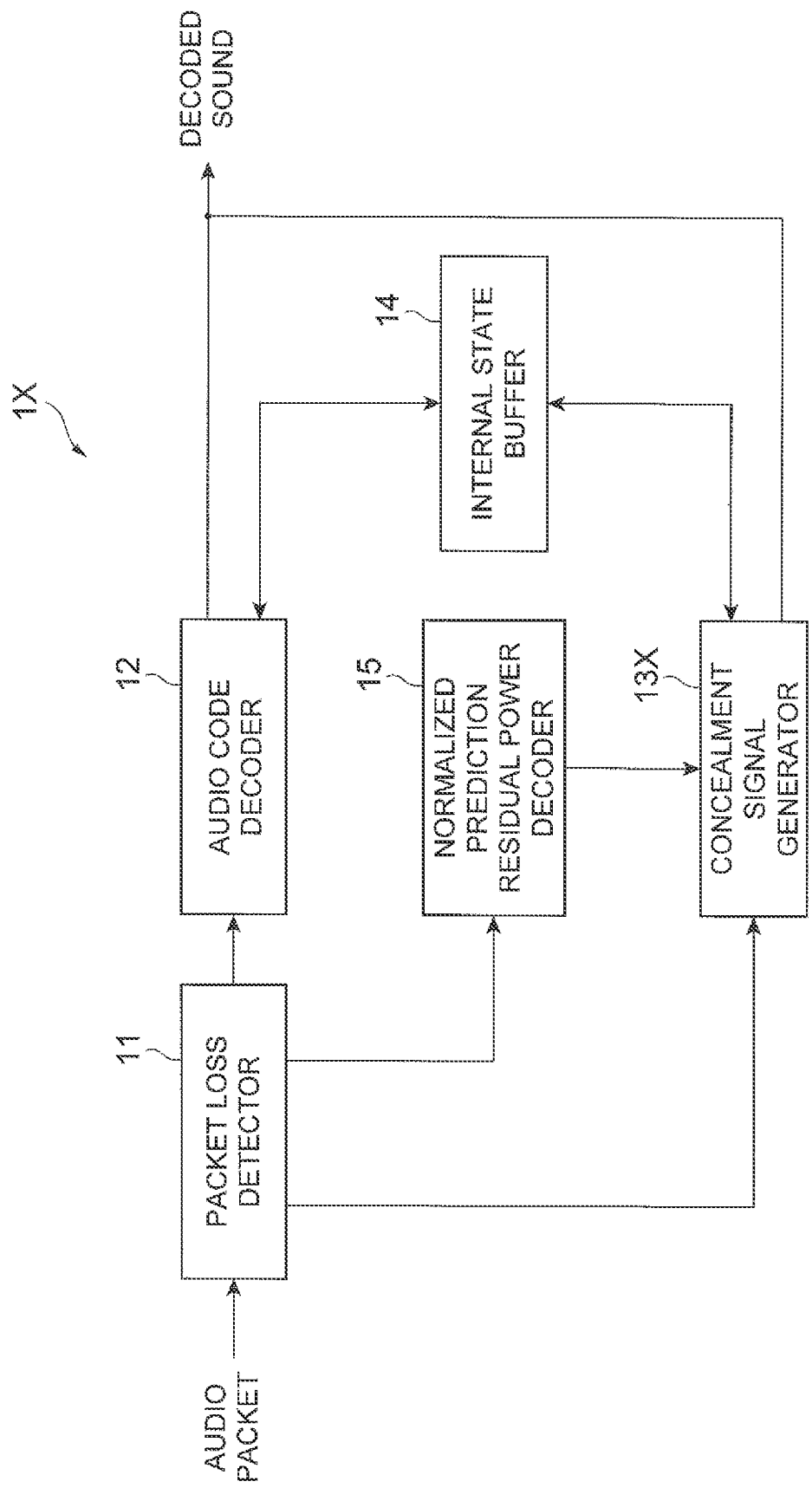
FIG. 7 is a configuration diagram of the audio decoder of Patent Literature 2.
Figure 8:
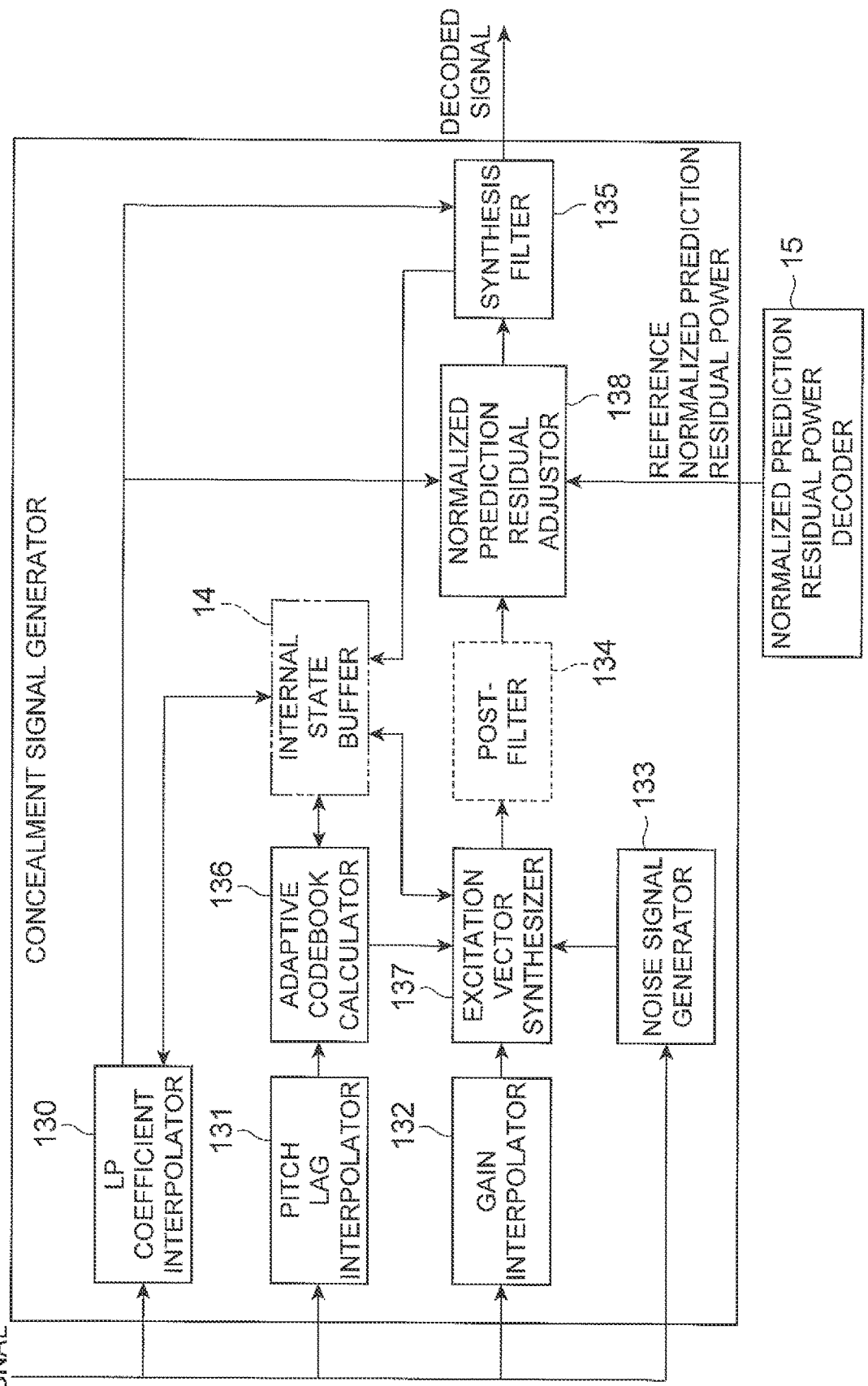
FIG. 8 is a functional configuration diagram of the concealment signal generator of Patent Literature 2.

The discontinuity detector 129 reads the LP coefficients of the fourth subframe in the lost packet frame from the internal state buffer 14 and calculates the power of the impulse response of the LP coefficients of the fourth subframe in the lost packet frame. The LP coefficients of the fourth subframe in the lost packet frame to be used can be the coefficients output by the LP coefficient interpolator 130 included in the concealment signal generator 13 shown in FIG. 6 and accumulated in the internal state buffer 14 upon the packet loss.

$$E_{-1} = 10 \log(\Sigma_{n=0}^{L'-1} h_{-1}^2(n))$$

$$h_{-1}(n) = \delta(n) - \Sigma_{i=1}^{P} \dot{a}_i^{(-1)} \cdot h_{-1}(n-i) \quad \text{[Mathematical Equation 65]}$$

Then, the discontinuity detector 129 detects a discontinuity, for example, by the below equation (step S26 in FIG. 15).

$$E_0 - E_{-1} > \text{Thres} \quad \text{[Mathematical Equation 66]}$$

When the gain change does not exceed the threshold (NO in step S27 of FIG. 15), the discontinuity detector 129 does not detect an occurrence of a discontinuity, and the ISP-LPC converter 122C outputs the LP coefficients and ends the processing. On the other hand, when the gain change exceeds the threshold (YES in step S27 of FIG. 15), the discontinuity detector 129 detects an occurrence of a discontinuity and sends a control signal indicative of a result of the detection for an occurrence of a discontinuity to the stability processor 121. When receiving the control signal, the stability processor 121 corrects the ISP parameters in the same manner as performed in the first embodiment (step S28 in FIG. 15). The subsequent operations of the ISF-ISP converter 122A, ISP interpolator 122B, and ISP-LPC converter 122C (steps S29, S2A, and S2B in FIG. 15) are the same as above.

As discussed in the above second embodiment, a discontinuity of decoded audio can be determined by the power of the excitation signal, and the discontinuous audio is reduced to improve the subjective quality in the same manner as performed in the first embodiment.

Third Embodiment

Upon a detection of discontinuity, the ISF parameters may be corrected by another method. The third embodiment differs from the first embodiment only in the stability processor 121, and thus only the operation of the stability processor 121 will be described.

When the discontinuity detector 129 detects a discontinuity, the stability processor 121 performs the following process to correct the ISF parameters.

With respect to the ISF parameters stored in the internal state buffer 14, $$\dot{\omega}_i^{-1} \quad \text{[Mathematical Equation 67]}$$

the stability processor 121 replaces the ISF parameters up to a low-order P' dimension (0<P'≤P) in accordance with the below equation. Here, the following definition is adopted.

$$\delta^{-1} = \dot{\omega}_{P'-1}^{-1}/P' \quad \text{[Mathematical Equation 68]}$$

$$\dot{\omega}_i^{-1} = \dot{\omega}_{i-1}^{-1} + \delta^{-1}$$

$$\omega_0^{-1} = \delta^{-1} \quad (0 \le i \le P') \quad \text{[Mathematical Equation 69]}$$

The stability processor 121 may overwrite the ISF parameters of the low-order P' dimensions with P'-dimension vectors obtained in advance by learning as follows.

$$\dot{\omega}_i^{-1} = \omega_i^0 \quad (0 \le i \le P') \quad \text{[Mathematical Equation 70]}$$

Next, as to the ISF parameters of the current frame, the stability processor 121 may, as performed in the first embodiment, perform the process of expanding the distance between elements to become $M_0$ times wider than the ordinary distance or may determine them in accordance with the below equation. Here, the following definition is adopted.

$$\delta^0 = \dot{\omega}_{P'-1}^0/P' \quad \text{[Mathematical Equation 71]}$$

$$\dot{\omega}_i^0 = \dot{\omega}_{i-1}^0 + \delta^0$$

$$\dot{\omega}_0^0 = \delta^0 \quad \text{[Mathematical Equation 72]}$$

The stability processor 121 may overwrite them with P'-dimensional vectors learned in advance.

$$\dot{\omega}_i^0 = \omega_i^0 \quad \text{[Mathematical Equation 73]}$$

Furthermore, the foregoing P'-dimensional vectors may be learned in the decoding process or may be defined, for example, as follows.

$$\omega_i^0 = (1-\lambda)\omega_i^{-1} + \lambda\dot{\omega}_i^{-1} \quad \text{[Mathematical Equation 74]}$$

In a frame at the start of decoding, however, $\omega_i^{-1}$ may be defined as predetermined P'-dimensional vector $\omega_i^{init}$.

The internal state buffer 14 updates the ISF parameters stored in the past with the new ISF parameters.

As discussed in the above third embodiment, the distance obtained by equally dividing the ISF/LSF parameters into those of a predetermined dimension can be used as the distance between elements of the ISF/LSF parameters given for ensuring the stability of the synthesis filter, whereby the discontinuous audio is reduced to improve the subjective quality as performed in the first and second embodiments.

Fourth Embodiment

A fourth embodiment will be described in which the encoding side detects an occurrence of a discontinuity and transmits a discontinuity determination code (indicative of a detection result) as included in audio codes to the decoding side and also in which the decoding side determines the operation of the stability process, based on the discontinuity determination code included in the audio codes.

(Regarding Encoding Side)

Figure 16:
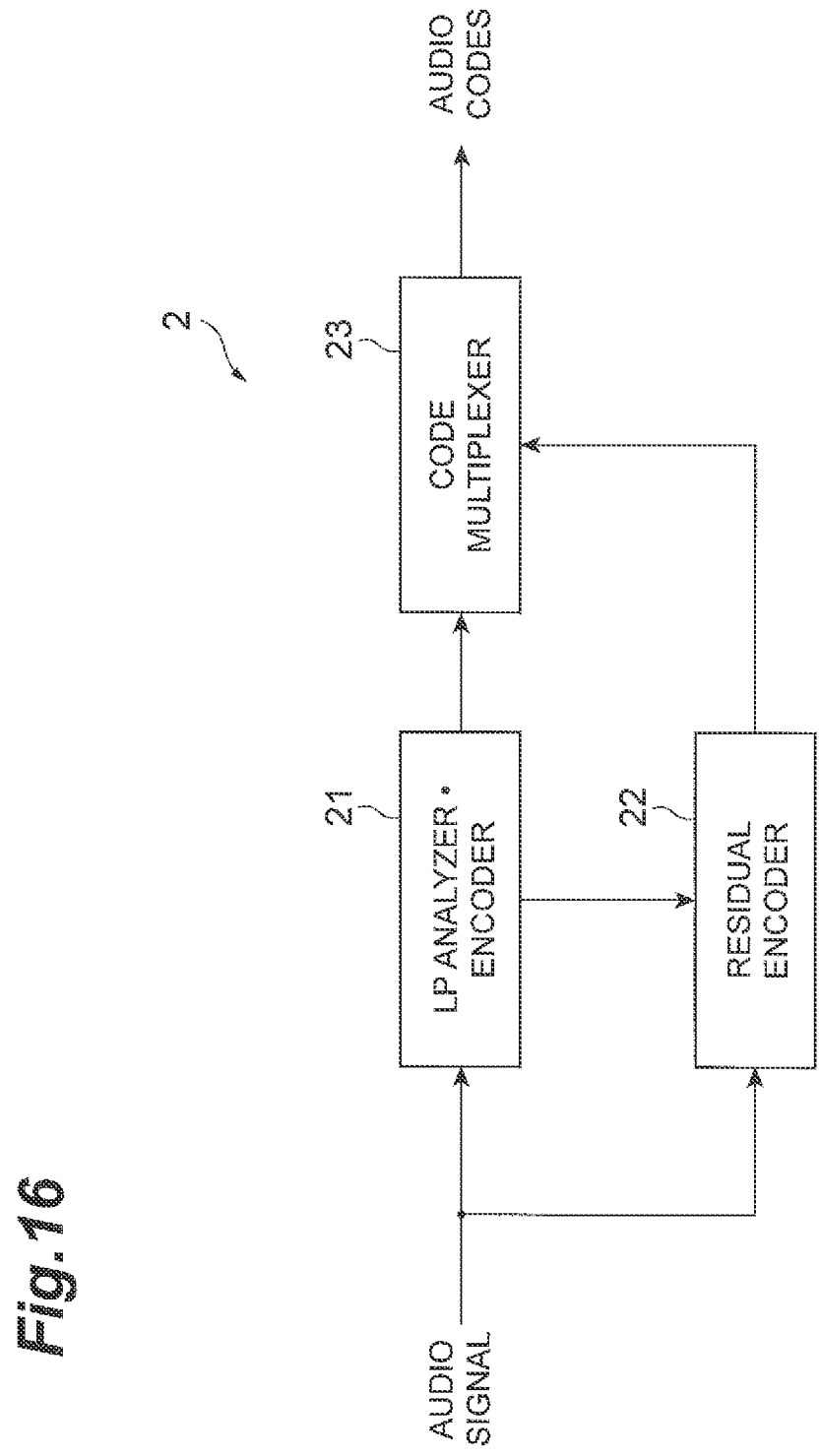
FIG. 16 is a configuration diagram of an audio encoder in fourth embodiment.
Figure 17:
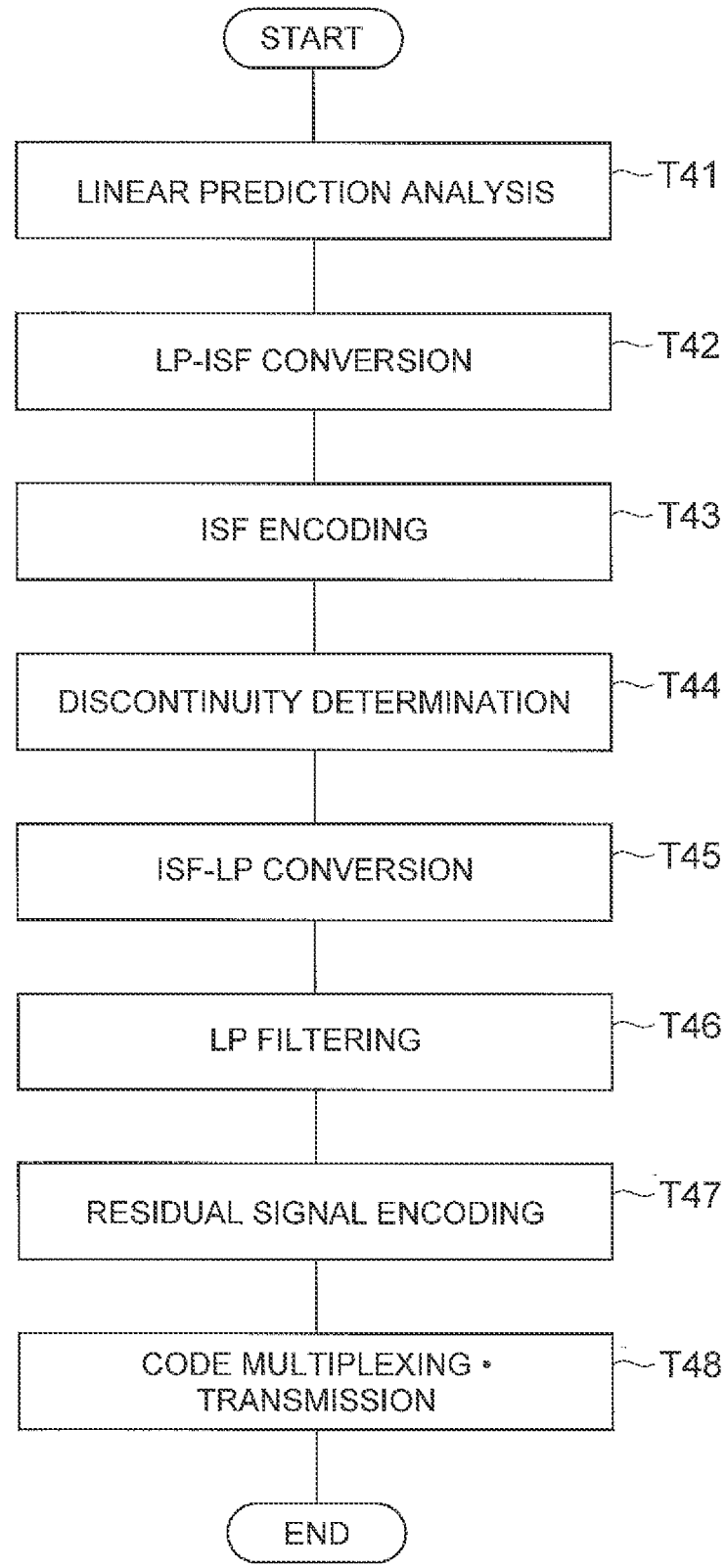
FIG. 17 is a configuration diagram of the audio encoder in the fourth embodiment.

FIG. 16 shows an exemplary functional configuration of the encoder 2, and FIG. 17 is a flowchart showing the processes performed in the encoder 2. As shown in FIG. 16, the encoder 2 has an LP analyzer/encoder 21, a residual encoder 22, and a code multiplexer 23.

Figure 18:
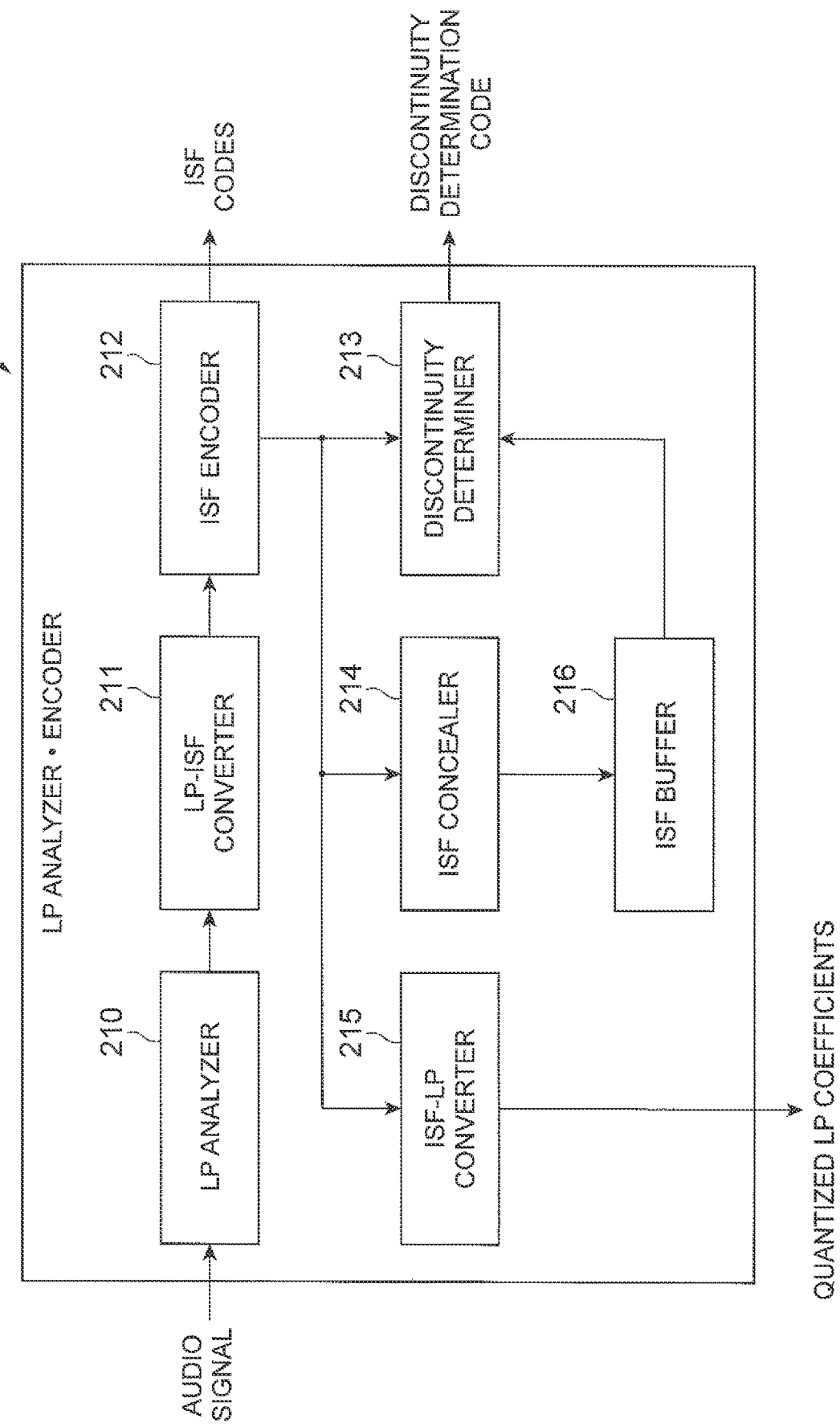
FIG. 18 is a configuration diagram of an LP analyzer/encoder in the fourth embodiment.
Figure 19:
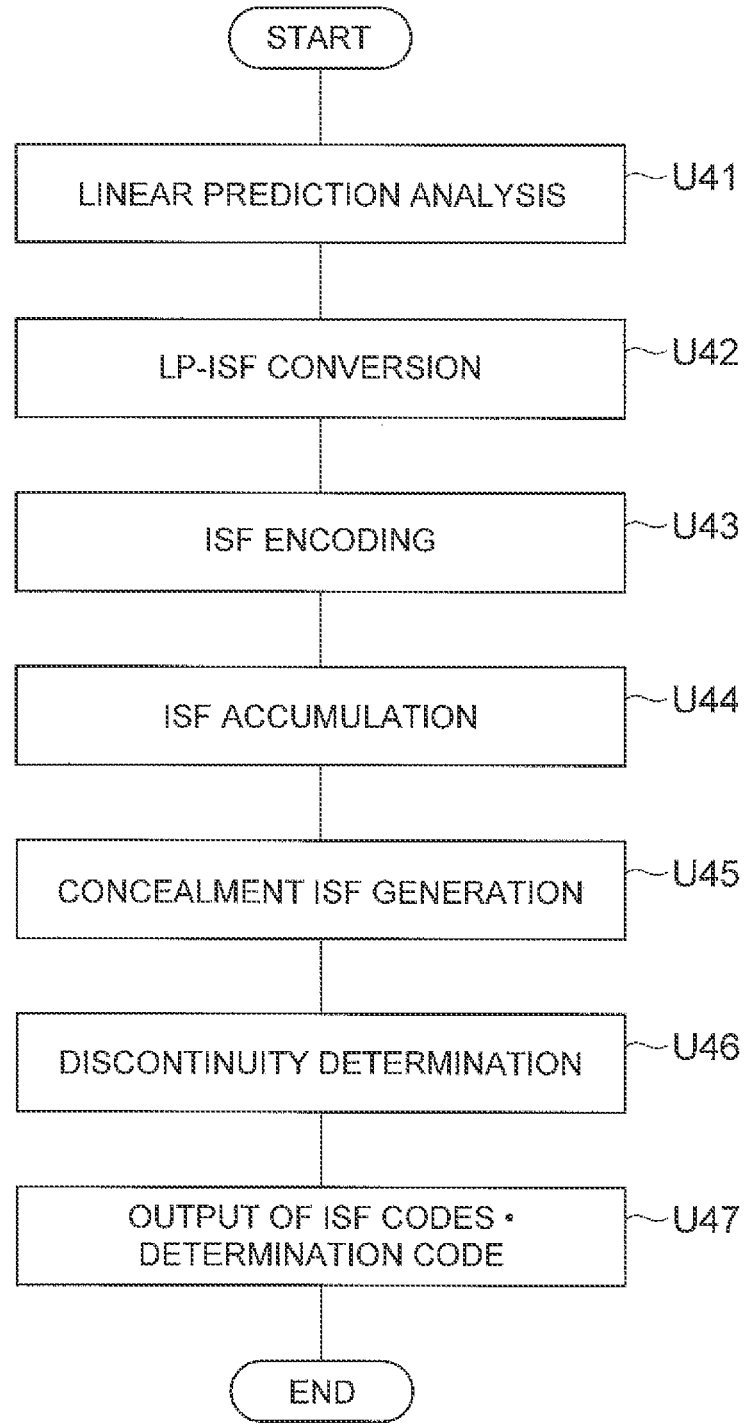
FIG. 19 is a processing flow of the LP analyzer/encoder in the fourth embodiment.

An exemplary functional configuration of the LP analyzer/encoder 21 among them is shown in FIG. 18, and a flowchart showing the processes performed in the LP analyzer/encoder 21 is shown in FIG. 19. As shown in FIG. 18, the LP analyzer/encoder 21 has an LP analyzer 210, an LP-ISF converter 211, an ISF encoder 212, a discontinuity determiner 213, an ISF concealer 214, an ISF-LP converter 215, and an ISF buffer 216.

In the LP analyzer/encoder 21, the LP analyzer 210 performs a linear prediction analysis on an input signal to obtain linear prediction coefficients (step T41 in FIG. 17 and step U41 in FIG. 18). For the calculation of linear prediction coefficients, an autocorrelation function is first calculated from the audio signal, and then the Levinson-Durbin algorithm or the like can be applied.

The LP-ISF converter 211 converts the calculated linear prediction coefficients into the ISP parameters in the same manner as performed in the first embodiment (steps T42, U42). The conversion from linear prediction coefficients into ISF parameters may be implemented by use of the method described in the Non Patent Literature.

The ISF encoder 212 encodes the ISF parameters using a predetermined method to calculate ISF codes (steps T43, U43) and outputs quantized ISF parameters obtained in the process of encoding to the discontinuity determiner 213, the ISF concealer 214, and the ISF-LP converter 215 (step U47). Here, the quantized ISF parameters are equal to the ISF parameters obtained by an inverse quantization of the ISF codes. A method of encoding may be vector-encoding, or encoding by a vector quantization or the like of error vectors from ISFs of the immediately preceding frame and mean vectors determined in advance by learning.

The discontinuity determiner 213 encodes a discontinuity determination flag stored in an internal buffer (not shown) built in the discontinuity determiner 213 and outputs a resultant discontinuity determination code (step U47). In addition, the discontinuity determiner 213 uses concealment ISF parameters $$\tilde{\omega}_i \quad \text{[Mathematical Equation 75]}$$

read from the ISF buffer 216 and the quantized ISF parameters $$\dot{\omega}_i \quad \text{[Mathematical Equation 76]}$$

to make a determination on a discontinuity in accordance with the below equation (steps T44, U46). Here, $Thres_\omega$ represents a threshold determined in advance, and P' an integer satisfying the following equation (0<P'≤P).

$$\Sigma_{i=0}^{P'-1}(\dot{\omega}_i - \tilde{\omega}_i)^2 > Thres_\omega \quad \text{[Mathematical Equation 77]}$$

The example is described above in which the discontinuity determination is made using the Euclidean distances between the ISF parameters. However, the discontinuity determination may be made by other methods.

The ISF concealer 214 calculates the concealment ISF parameters from the quantized ISF parameters by the same process as performed by the decoder-side ISF concealer and outputs the resultant concealment ISF parameters to the ISF buffer 216 (steps U44, U45). The operation of the ISF concealment process may be performed by any method as long as it is the same process as that of the decoder-side packet loss concealer.

The ISF-LP converter 215 calculates quantized linear prediction coefficients by converting the foregoing quantized ISF parameters and outputs a resultant quantized linear prediction coefficients to the residual encoder 22 (step T45). A method used for converting the ISF parameters into the quantized linear prediction coefficients may be the method described in the Non Patent Literature.

The residual encoder 22 filters the audio signal by use of the quantized liner prediction coefficients to calculate residual signals (step T46).

Next, the residual encoder 22 encodes the residual signals by encoding means using CELP or TCX (Transform Coded Excitation) or by encoding means switchably using CELP and TCX and outputs resultant residual codes (step T47). Since the operation of the residual encoder 22 is less relevant to the present invention, description thereof is omitted herein.

The code multiplexer 23 assembles the ISF codes, the discontinuity determination code and the residual codes in a predetermined order and outputs resultant audio codes (step T48).

(Regarding Decoding Side)

Figure 20:
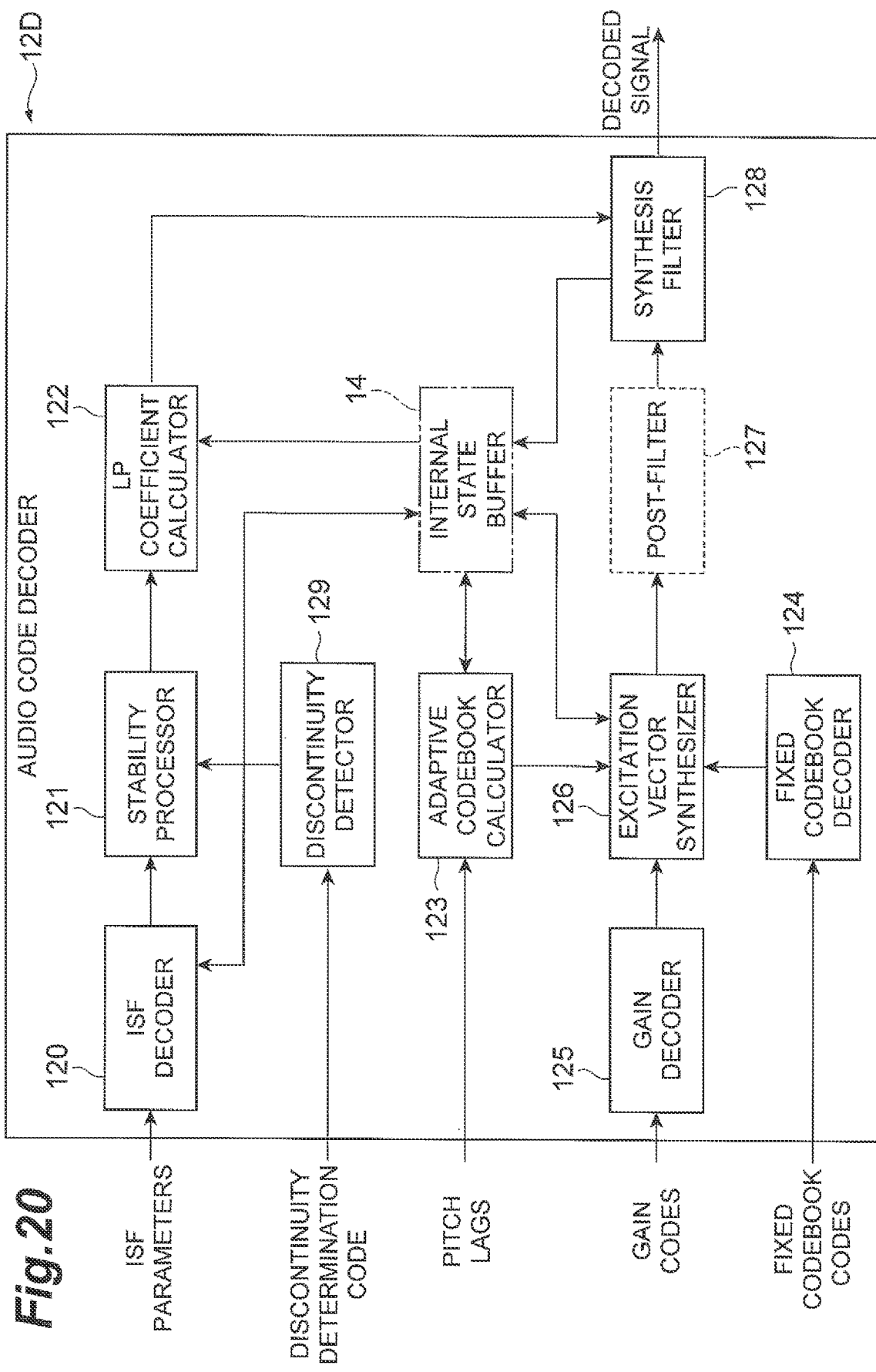
FIG. 20 is a functional configuration diagram of the audio code decoder in the fourth embodiment.
Figure 21:
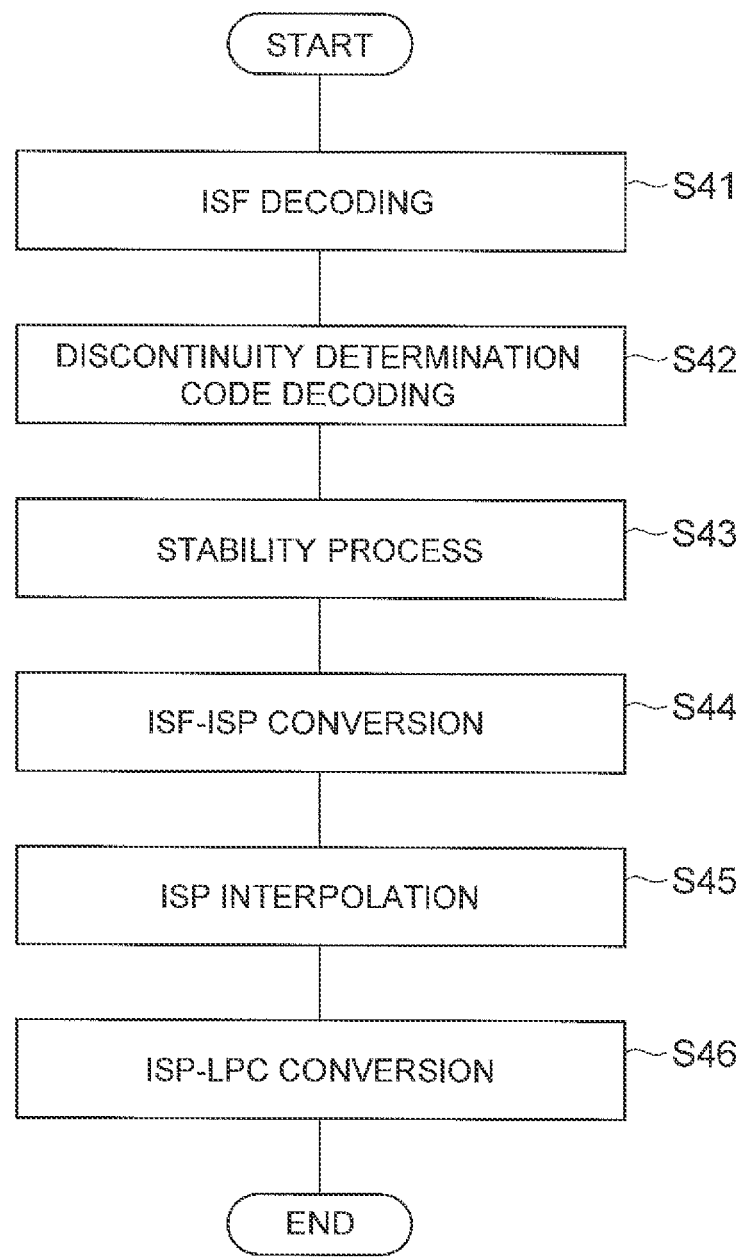
FIG. 21 is a processing flow of the LP coefficient calculator in the fourth embodiment.

An audio signal processing device according to the fourth embodiment has the same configuration as that of the aforementioned audio decoder 1 in FIG. 1 and has a novel feature in the audio code decoder, and thus the audio code decoder will be described below. FIG. 20 shows an exemplary functional configuration of an audio code decoder 12D, and FIG. 21 is a flowchart showing the process of calculating the LP coefficients. The audio code decoder 12D shown in FIG. 20 is configured by adding the discontinuity detector 129 to the aforementioned configuration shown in FIG. 3.

The ISF decoder 120 decodes the ISF codes and outputs resultant codes to the stability processor 121 and the internal state buffer 14 (step S41 in FIG. 21).

The discontinuity detector 129 decodes the discontinuity determination code and outputs a resultant discontinuity detection result to the stability processor 121 (step S42 in FIG. 21).

The stability processor 121 performs the stability process according to the discontinuity detection result (step S43 in FIG. 21). The processing procedure of the stability processor to be used can be the same method as executed in the first embodiment and the third embodiment.

The stability processor 121 may perform the stability process as described below, on the basis of other parameters included in the audio codes, in addition to the discontinuity detection result acquired from the discontinuity determination code. For example, the stability processor 121 may be configured to perform the stability process in such a manner that an ISF stability stab is calculated in accordance with the below equation and that when the ISF stability exceeds a threshold, even if the discontinuity determination code shows a detection of a discontinuity, the process is performed as if no discontinuity is detected. Here, C is a constant determined in advance.

$$\text{stab}=1.25-\Sigma_{i=0}^{P'-1}(\dot{\omega}_i^0-\dot{\omega}_i^{-1})^2/C \quad \text{[Mathematical Equation 78]}$$

The ISF-ISP converter 122A in the LP coefficient calculator 122 converts the ISF parameters into the ISP parameters by the same processing procedure as performed in the first embodiment (step S44 in FIG. 21).

The ISP interpolator 122B calculates the ISP parameters for the respective subframes by the same processing procedure as performed in the first embodiment (step S45 in FIG. 21).

The ISP-LPC converter 122C converts the ISP parameters calculated for the respective subframes into the LPC parameters by the same processing procedure as performed in the first embodiment (step S46 in FIG. 21).

In the fourth embodiment as described above, the encoding side performs the discontinuity determination (the discontinuity determination using the Euclidian distances between concealment ISF parameters and quantized ISF parameters, as an example) encodes auxiliary information about a result of the determination and outputs encoded information to the decoding side, and the decoding side determine a discontinuity using the auxiliary information obtained by decoding. In this manner, the appropriate processing can be executed according to the discontinuity determination result made by the encoding side while the encoding side and the decoding side work in concert with each other.

Fifth Embodiment (Regarding Encoding Side)

The functional configuration of the encoder is the same as that of the fourth embodiment shown in FIG. 16, and the processing flow of the encoder is the same as the processing flow of the fourth embodiment shown in FIG. 17. The below will describe the LP analyzer/encoder according to the fifth embodiment which is different from that in the fourth embodiment.

Figure 22:
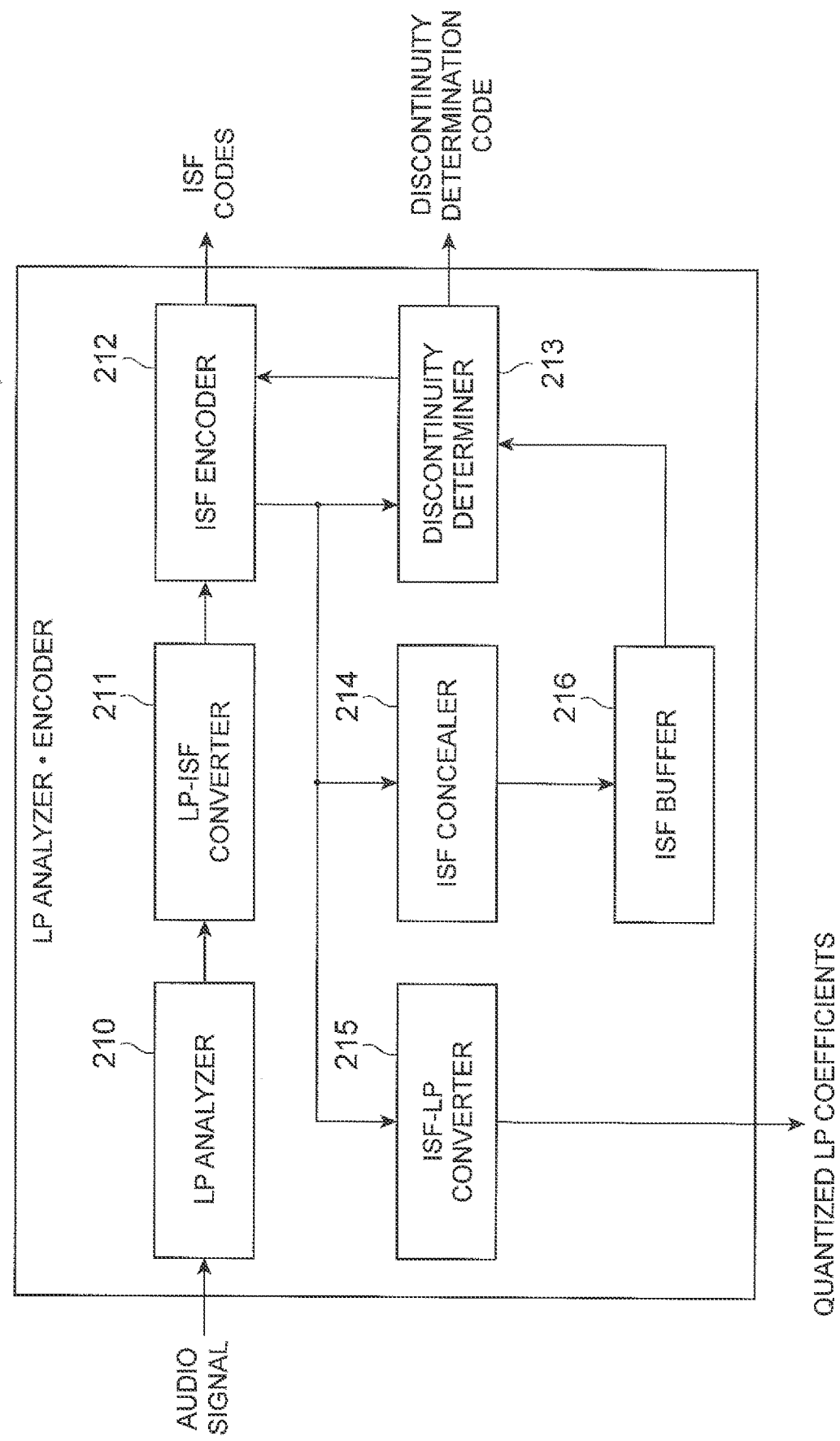
FIG. 22 is a configuration diagram of the LP analyzer/encoder in the fifth embodiment.
Figure 23:
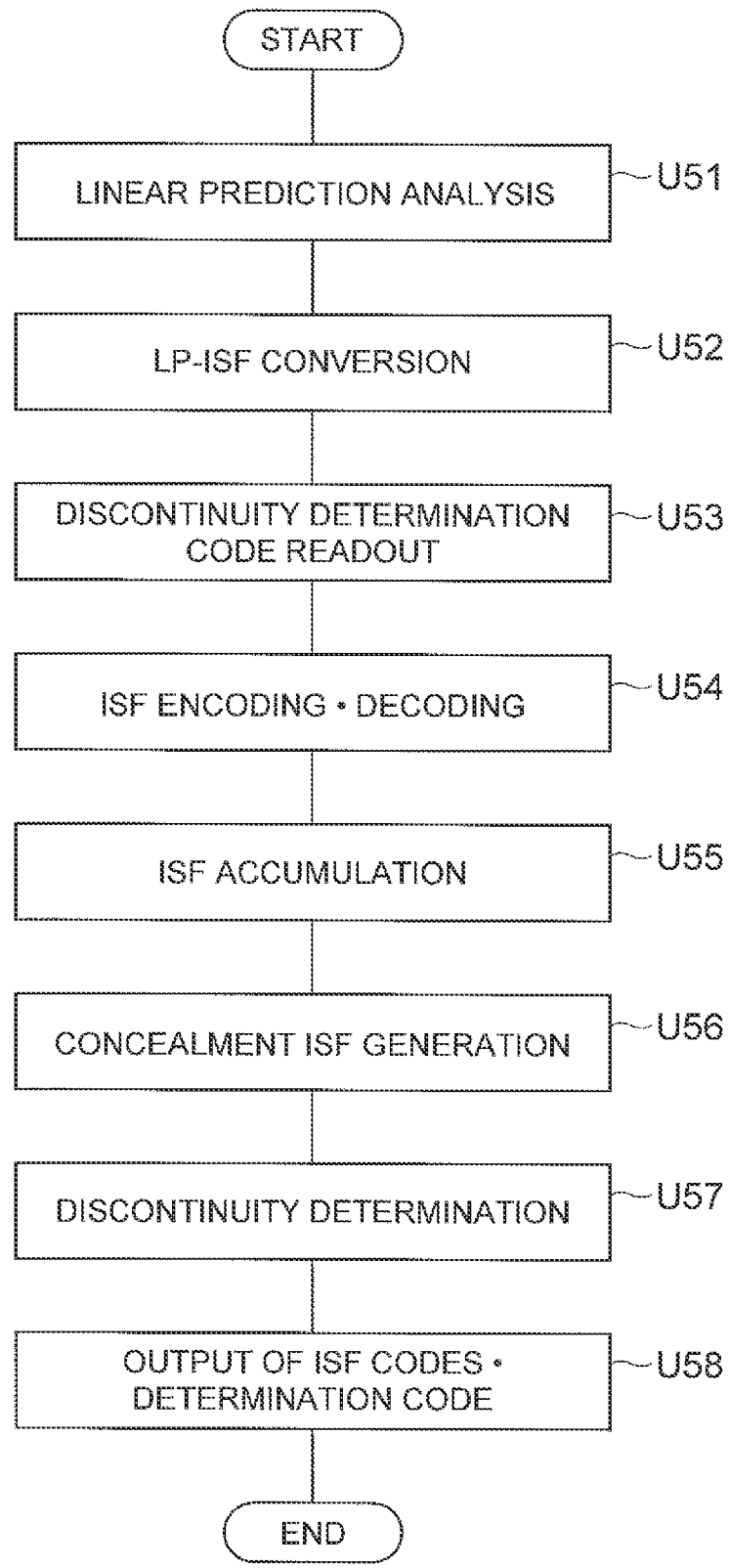
FIG. 23 is a processing flow of the LP analyzer/encoder in the fifth embodiment.

FIG. 22 shows an exemplary functional configuration of the LP analyzer/encoder, and FIG. 23 shows a flow of the processes performed by the LP analyzer/encoder. As shown in FIG. 22, the LP analyzer/encoder 21S has the LP analyzer 210, the LP-ISF converter 211, the ISF encoder 212, the discontinuity determiner 213, the ISF concealer 214, the ISF-LP converter 215, and the ISF buffer 216.

In this LP analyzer/encoder 21S, the LP analyzer 210 performs the linear prediction analysis on the input signal by the same process as performed in the fourth embodiment to obtain the linear prediction coefficients (step U51 in FIG. 23).

The LP-ISF converter 211 converts the calculated linear prediction coefficients into the ISF parameters by the same process as performed in the fourth embodiment (step U52 in FIG. 23). The method described in the Non Patent Literature may be used for the conversion from the linear prediction coefficients into the ISF parameters.

The ISF encoder 212 reads the discontinuity determination flag stored in the internal buffer (not shown) of the discontinuity determiner 213 (step U53 in FIG. 23).

<Case where Discontinuity Determination Flag Indicates Detection of Discontinuity>

The ISF encoder 212 calculates the ISF codes by vector-quantization of ISF residual parameters $r_i$ calculated by the below equation (step U54 in FIG. 23). Here, the ISF parameters calculated by the LP-ISF converter are denoted by $\omega_i$, and mean vectors, which are $\text{mean}_i$, obtained in advance by learning.

$$r_i = \omega_i - \text{mean}_i \quad \text{[Mathematical Equation 79]}$$

Next, the ISF encoder 212 uses the quantized ISF residual parameters $$\hat{r}_i \quad \text{[Mathematical Equation 80]}$$

obtained by quantization of the ISF residual parameters $r_i$ to update the ISF residual parameter buffer in accordance with the following equation (step U55 in FIG. 23).

$$\hat{r}_i^{-1} = \hat{r}_i \quad \text{[Mathematical Equation 81]}$$

<Case where Discontinuity Determination Flag does not Indicate Detection of Discontinuity>

The ISF encoder 212 calculates the ISF codes by vector-quantization of the ISF residual parameters $r_i$ calculated by the below equation (step U54 in FIG. 23). Here, the ISF residual parameters obtained by decoding in the immediately preceding frame are denoted as follows.

$$\hat{r}_i^{-1} \quad \text{[Mathematical Equation 82]}$$

$$r_i = \omega_i - \text{mean}_i - \tfrac{1}{3}\hat{r}_i^{-1} \quad \text{[Mathematical Equation 83]}$$

Next, the ISF encoder 212 uses the quantized ISF residual parameters $$\hat{r}_i \quad \text{[Mathematical Equation 84]}$$

obtained by quantization of the ISF residual parameters $r_i$ to update the ISF residual parameter buffer in accordance with the following equation (step U55 in FIG. 23).

$$\hat{r}_i^{-1} = \hat{r}_i \quad \text{[Mathematical Equation 85]}$$

By the above procedure, the ISF encoder 212 calculates the ISF codes and outputs quantized ISF parameters obtained in the process of encoding to the discontinuity determiner 213, the ISF concealer 214, and the ISF-LP converter 215.

The ISF concealer 214 calculates the concealment ISF parameters from the quantized ISF parameters by the same process as performed by the decoder-side ISF concealer in the same manner as executed in the fourth embodiment and outputs them to the ISF buffer 216 (steps U56, U58 in FIG. 23). The operation of the ISF concealment process may be performed by any method as long as it is the same process as that of the decoder-side packet loss concealer.

The discontinuity determiner 213 performs a determination of a discontinuity by the same process as performed in the fourth embodiment and stores a determination result in the internal buffer (not shown) of the discontinuity determiner 213 (step U57 in FIG. 23).

The ISF-LP converter 215 converts the quantized ISF parameters, in the same manner as performed in the fourth embodiment, to calculate the quantized linear prediction coefficients and outputs them to the residual encoder 22 (FIG. 16) (step U58 in FIG. 23).

(Regarding Decoding Side)

Figure 24:
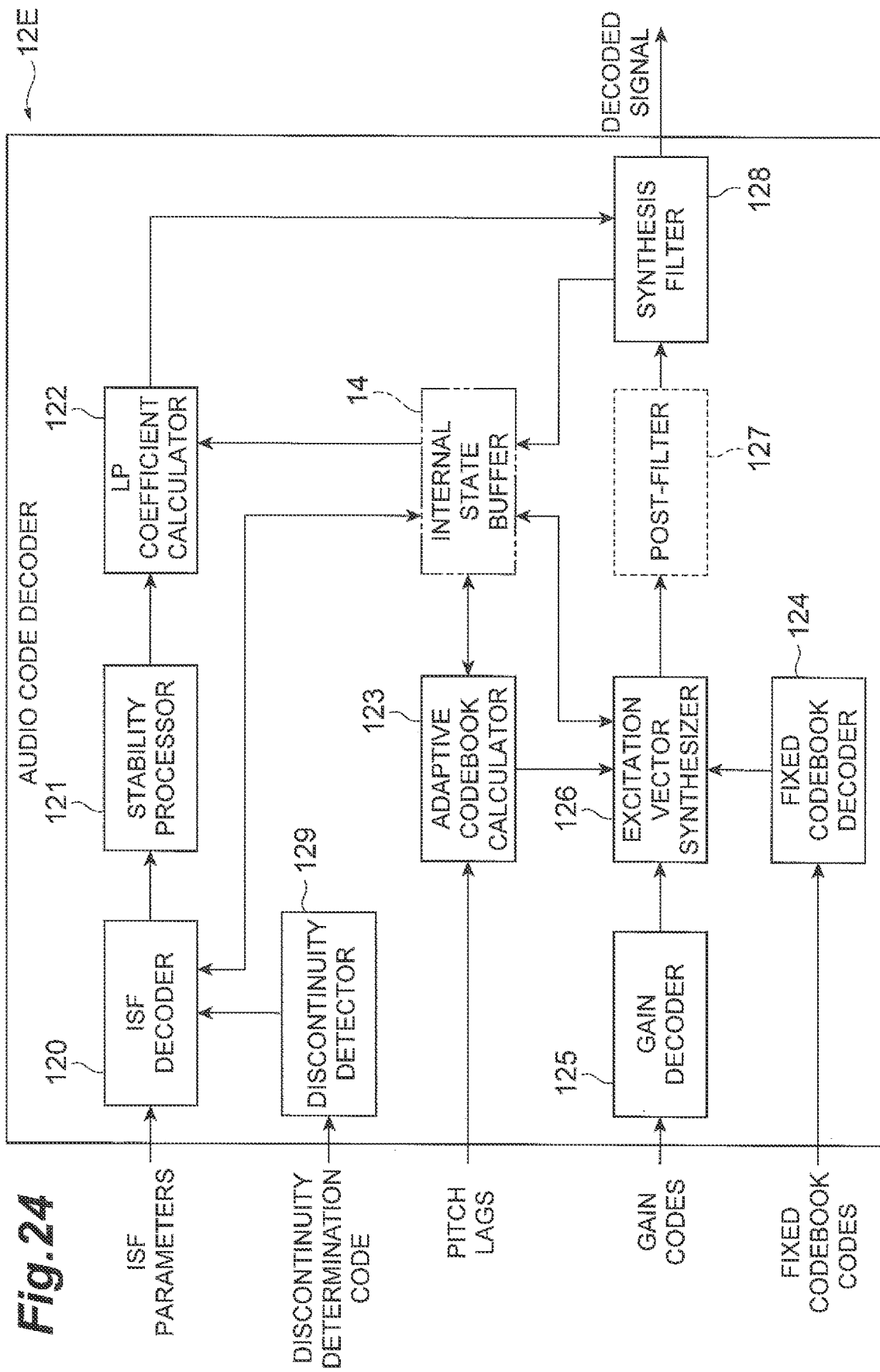
FIG. 24 is a functional configuration diagram of the audio code decoder in the fourth embodiment.
Figure 25:
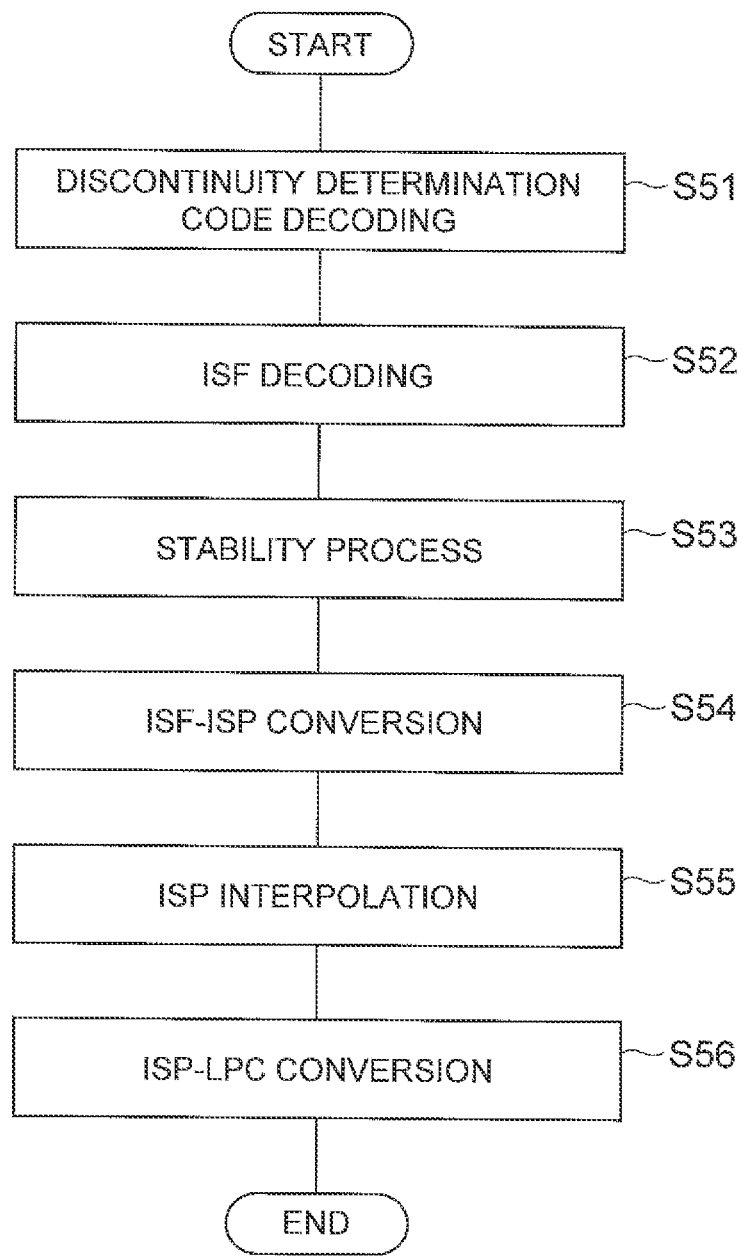
FIG. 25 is a processing flow of the LP coefficient calculator in the fifth embodiment.

An audio signal processing device according to the fifth embodiment has the same configuration as that of the aforementioned audio decoder 1 in FIG. 1 and has a novel feature in the audio code decoder, and thus the audio code decoder will be described below. FIG. 24 shows an exemplary functional configuration of the audio code decoder 12E, and FIG. 25 shows a flow of the calculation process performed by the LP coefficients. The audio code decoder 12E shown in FIG. 24 is configured by adding the discontinuity detector 129 to the aforementioned configuration shown in FIG. 3.

The discontinuity detector 129 decodes the discontinuity determination code and outputs the resultant discontinuity determination flag to the ISF decoder 120 (step S51 in FIG. 25).

The ISF decoder 120 calculates the ISF parameters as follows, depending upon the value of the discontinuity determination flag, and outputs the ISF parameters to the stability processor 121 and the internal state buffer 14 (step S52 in FIG. 25).

<Case where Discontinuity Determination Flag Indicates Detection of Discontinuity>

The ISF decoder 120 uses the quantized ISF residual parameters $$\hat{r}_i \quad \text{[Mathematical Equation 86]}$$

obtained by decoding of the ISF codes, and the mean vectors $\text{mean}_i$ obtained in advance by learning to obtain the quantized ISF parameters $$\dot{\omega}_i \quad \text{[Mathematical Equation 87]}$$

in accordance with the following equation.

$$\dot{\omega}_i = \text{mean}_i + \hat{r}_i \quad \text{[Mathematical Equation 88]}$$

Next, the ISF decoder 120 updates the ISF residual parameters stored in the internal state buffer 14 in accordance with the following equation.

$$\hat{r}_i^{-1} = \hat{r}_i \quad \text{[Mathematical Equation 89]}$$

<Case where Discontinuity Determination Flag does not Indicate Detection of Discontinuity>

The ISF decoder 120 reads, from the internal state buffer 14, the ISF residual parameters $$\hat{r}_i^{-1} \quad \text{[Mathematical Equation 90]}$$

obtained by decoding of the immediately preceding frame and uses the resultant ISF residual parameters $$\hat{r}_i^{-1}, \quad \text{[Mathematical Equation 91]}$$

the mean vectors $\text{mean}_i$ obtained in advance by learning and the quantized ISF residual parameters $$\hat{r}_i \quad \text{[Mathematical Equation 92]}$$

obtained by decoding of the ISF codes to calculate the quantized ISF parameters $$\dot{\omega}_i \quad \text{[Mathematical Equation 93]}$$

in accordance with the following equation.

$$\dot{\omega}_i = \text{mean}_i + \hat{r}_i + \tfrac{1}{3}\hat{r}_i^{-1} \quad \text{[Mathematical Equation 94]}$$

Next, the ISF decoder 120 updates the ISF residual parameters stored in the internal state buffer 14 in accordance with the following equation.

$$\hat{r}_i^{-1} = \hat{r}_i \quad \text{[Mathematical Equation 95]}$$

The stability processor 121 performs the same process as performed in the first embodiment (step S53 in FIG. 25) when a discontinuity is not detected.

The ISF-ISP converter 122A in the LP coefficient calculator 122 converts the ISF parameters into the ISP parameters by the same processing procedure as described in the first embodiment (step S54 in FIG. 25).

The ISP interpolator 122B calculates the ISP parameters for the respective subframes by the same processing procedure as performed in the first embodiment (step S55 in FIG. 25).

The ISP-LPC converter 122C, by the same processing procedure as performed in the first embodiment (step S56 in FIG. 25), converts the ISP parameters calculated for the respective subframes into the LPC parameters.

In the fifth embodiment as described above, the encoding side is configured as follows: When the discontinuity determination flag does not indicate a detection of a discontinuity, the vector quantization of the ISF residual parameters is carried out using the ISF residual parameters obtained by decoding of the immediately preceding frame. On the other hand, when the discontinuity determination flag indicates a detection of a discontinuity, the encoder avoids using the ISF residual parameters obtained by decoding of the immediately preceding frame. Similarly, the decoding side is configured as follows: When the discontinuity determination flag does not indicate a detection of a discontinuity, the quantized ISF parameters are calculated using the ISF residual parameters obtained by decoding of the immediately preceding frame. On the other hand, when the discontinuity determination flag indicates a detection of discontinuity, the decoder avoids using the ISF residual parameters obtained by decoding of the immediately preceding frame. In this manner, the appropriate processing according to a discontinuity determination result can be executed while the encoding side and the decoding side work in concert with each other.

Sixth Embodiment

The above first to fifth embodiments may be applied in combination. For example, as described in the fourth embodiment, the decoding side decodes the discontinuity determination code included in the audio codes from the encoding side to detect a discontinuity. When a discontinuity is detected, it may carry out the subsequent operation as follows.

For the ISF parameters $$\dot{\omega}_i^{-1}$$ [Mathematical Equation 96]

stored in the internal state buffer, the ISF parameters up to the low-degree P' dimension (0<P'≤P) are replaces in accordance with the following equation as described in the third embodiment.

$$\dot{\omega}_i^{-1} = \omega_i^0 (0 \leq i < P')$$ [Mathematical Equation 97]

On the other hand, the ISF parameters of the current frame are calculated in accordance with the following equation as described in the fifth embodiment.

$$\dot{\omega}_i = \text{mean}_i + \dot{r}_i$$ [Mathematical Equation 98]

Thereafter, using the ISF parameters obtained as described above, the LP coefficients are obtained by the processes of the ISF-ISP converter 122A, the ISP interpolator 122B, and the ISP-LPC converter 122C as performed in the first embodiment.

It is also effective to adopt optional combinations of the first to fifth embodiments as described above.

Seventh Embodiment

It may be considered in the decoding operation according to the above first to sixth embodiments and their modifications, how the frame is lost (e.g., whether a single frame is lost or consecutive frames are lost). In the seventh embodiment, it suffices that a discontinuity detection is made using, for example, the result of decoding of the discontinuity determination code included in the audio codes, and the method of how it should be performed is not limited to the above.

An audio signal processing device according to the seventh embodiment has the same configuration as that of the aforementioned audio decoder 1 in FIG. 1 and has a novel feature in the audio code decoder, and thus the audio code decoder will be described below.

Figure 26:
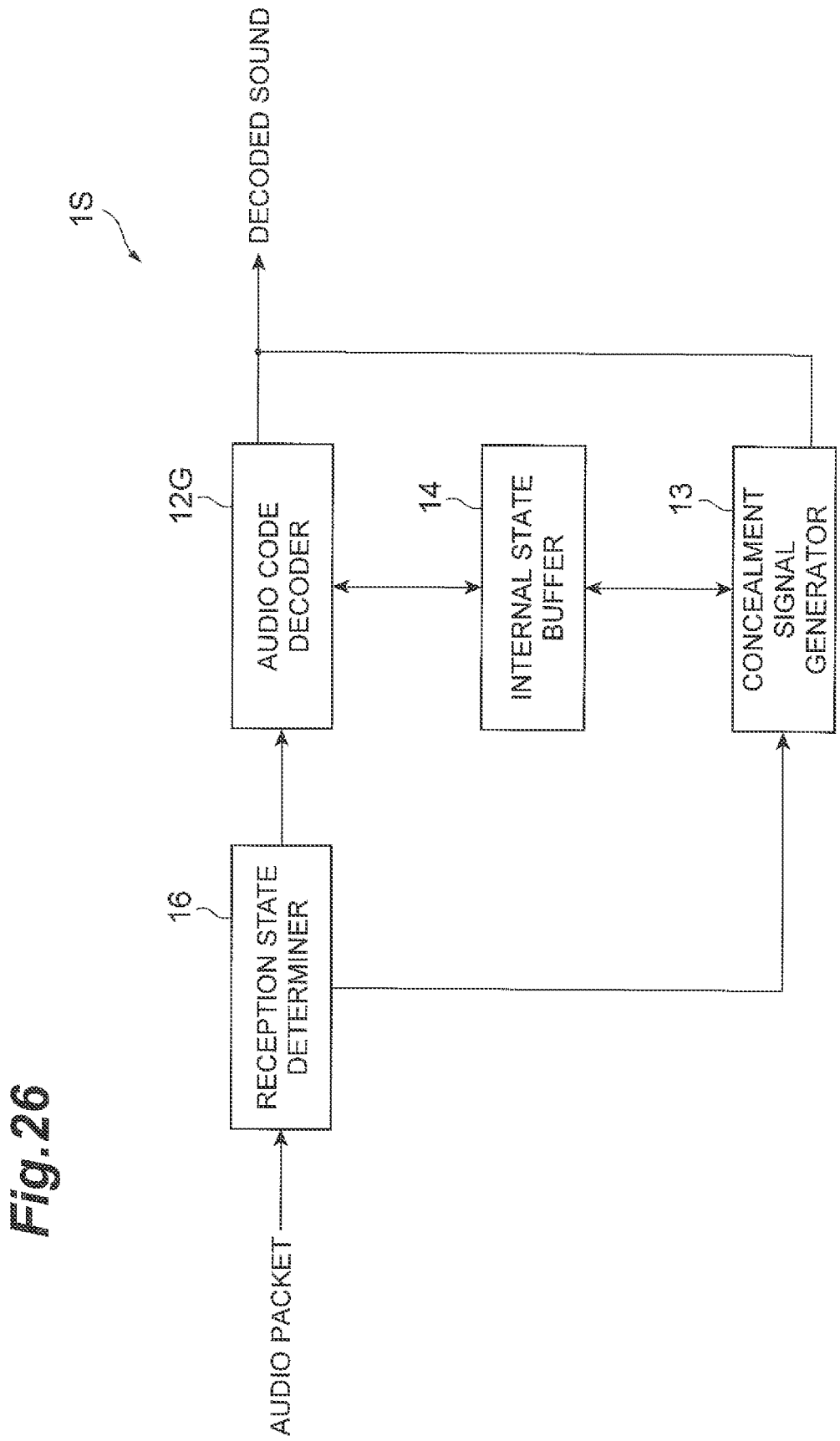
FIG. 26 is a configuration diagram of the audio decoder in the seventh embodiment.
Figure 27:
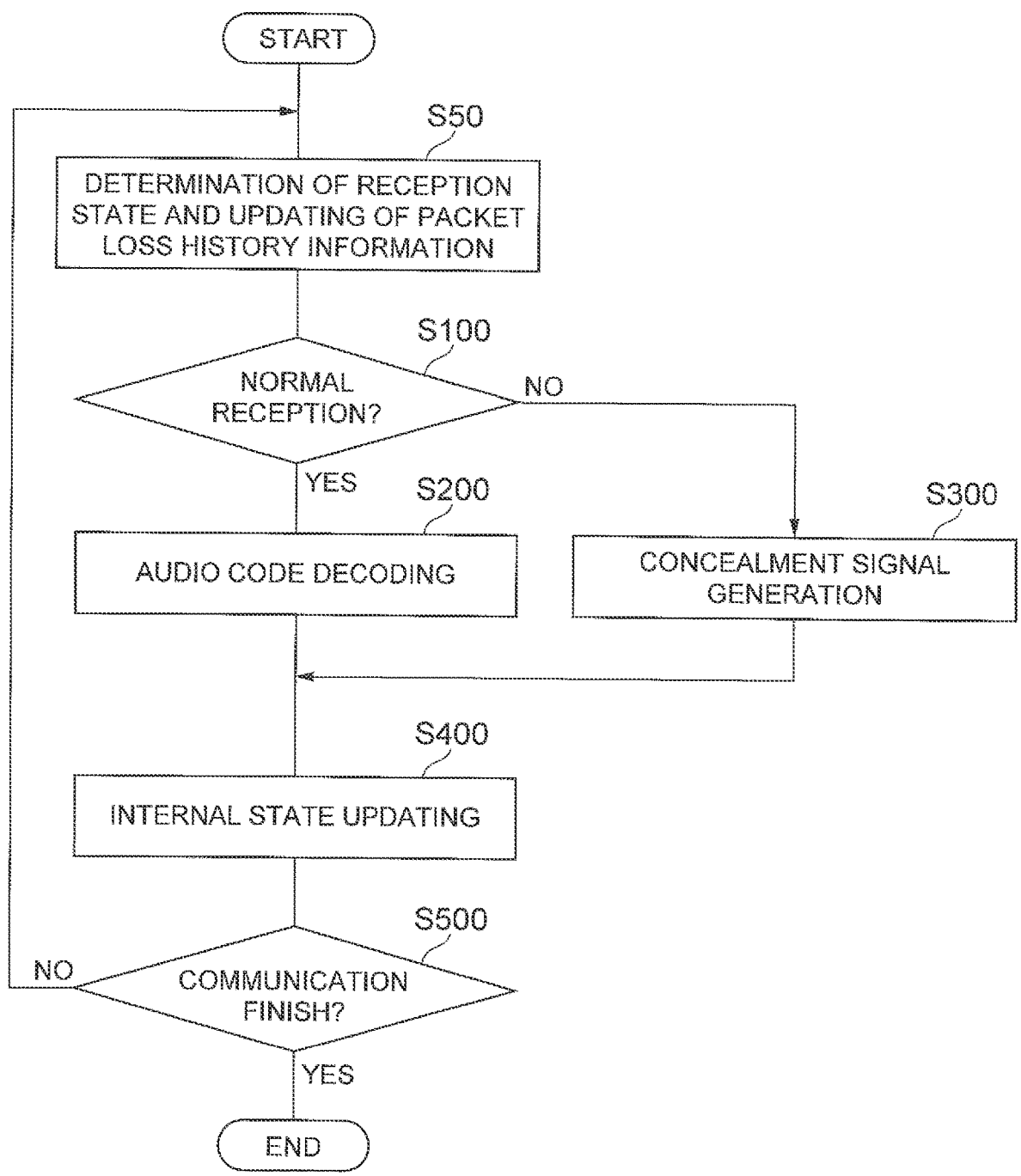
FIG. 27 is a processing flow of the audio decoder in the seventh embodiment.

FIG. 26 shows an exemplary configuration of the audio decoder 1S according to the seventh embodiment, and FIG. 27 shows a flowchart of the processes performed in the audio decoder. As shown in FIG. 26, in addition to the aforementioned audio code decoder 12G, the concealment signal generator 13 and the internal state buffer 14, the audio decoder 1S has a reception state determiner 16 that determines packet reception states in some past frames and stores a packet loss history.

The reception state determiner 16 determines a packet reception state and updates the packet loss history information, based on a determination result (step S50 in FIG. 27).

When a packet loss is detected (NO in step S100), the reception state determiner 16 outputs a packet loss detection result of the pertinent frame to the concealment signal generator 13, and the concealment signal generator 13 generates the concealment signal as described above and updates the internal states (steps S300, S400). The concealment signal generator 13 may also utilize the packet loss history information for interpolation of parameters or the like.

On the other hand, when no packet loss is detected (YES in step S100), the reception state determiner 16 outputs the packet loss history information including a packet loss detection result of the pertinent frame and the audio codes included in the received packet to the audio code decoder 12, and the audio code decoder 12 decodes the audio codes as described before and updates the internal states (steps S200, S400).

Thereafter, the processes of steps S50 to S400 are repeated until the communication ends (or until step S500 results in a determination of YES).

Figure 28:
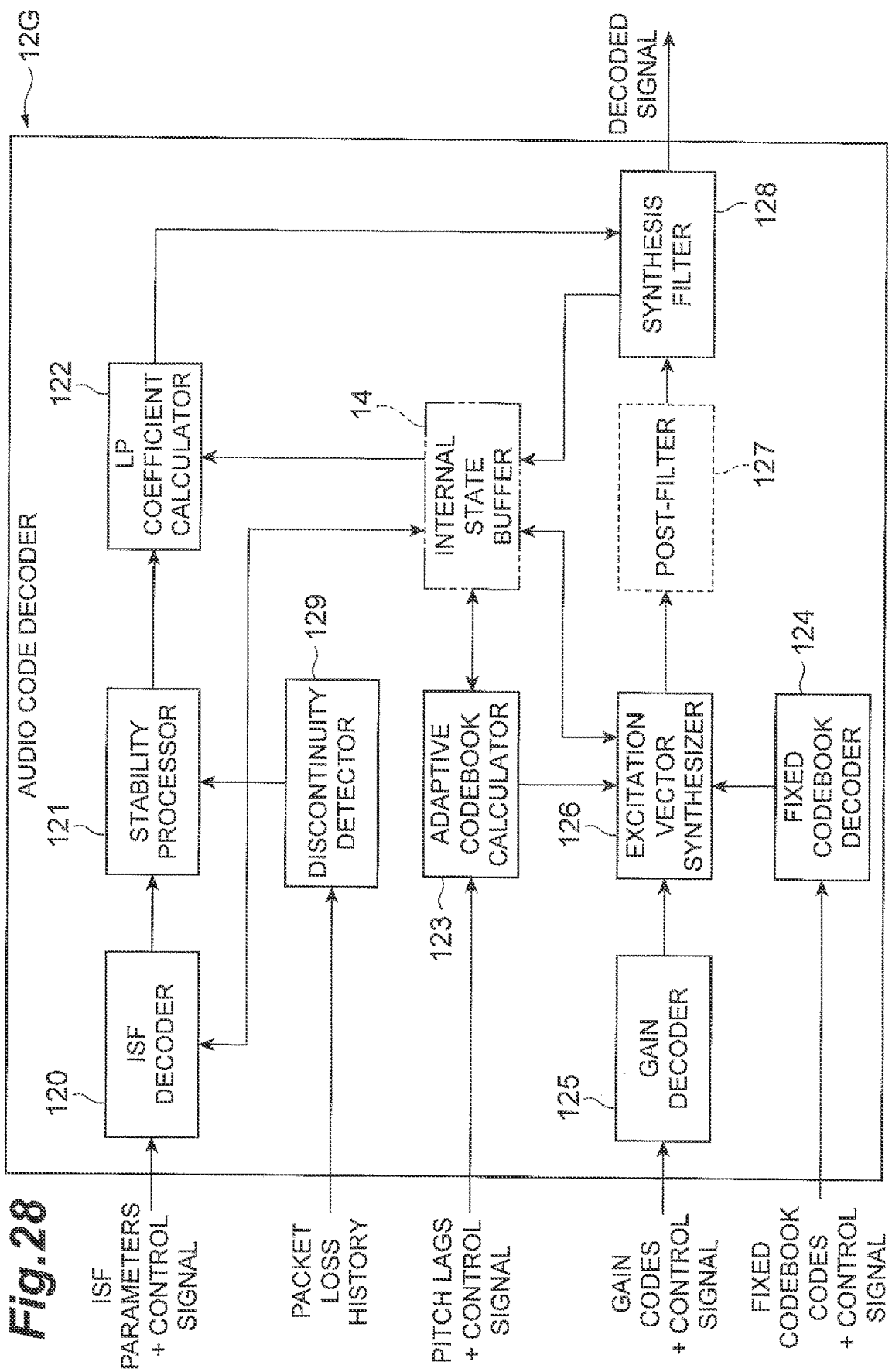
FIG. 28 is a functional configuration diagram of the audio code decoder in the seventh embodiment.
Figure 29:
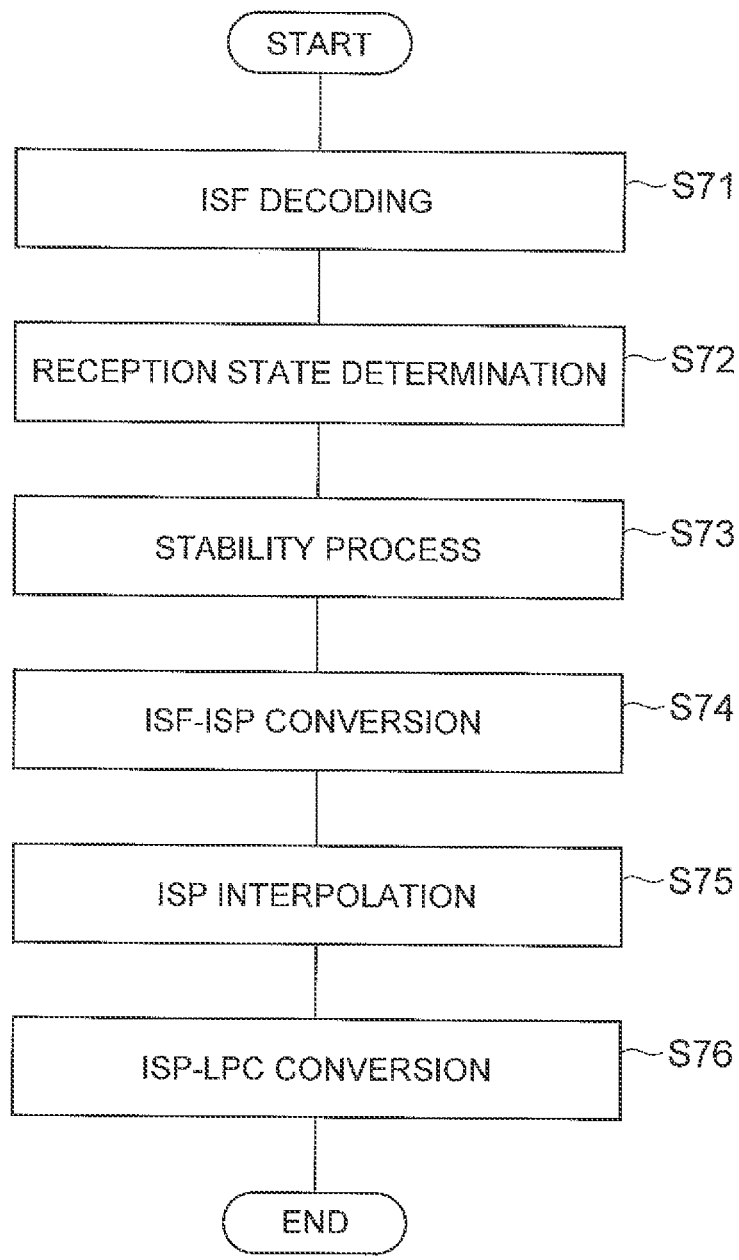
FIG. 29 is a processing flow of calculation of the LP coefficients in the seventh embodiment.

FIG. 28 shows an exemplary functional configuration of the audio code decoder 12G, and FIG. 29 shows a flowchart of the calculation processes performed by the LP coefficients. An example will be described below using the packet loss history information only for the LP coefficient calculator 122, but the audio code decoder may be configured to use the packet loss history information for other constitutive elements.

Since the audio code decoder 12G has the same configuration as described in the first embodiment, except for the configuration associated with the calculation process of LP coefficients, the below will describe the configuration and its operation associated with the calculation process of LP coefficients.

The ISF decoder 120 decodes the ISF codes in the same manner as performed in the first embodiment and outputs the ISF parameters to the stability processor 121 (step S71 in FIG. 29).

The discontinuity detector 129 refers to the packet loss history information to determine the reception state (step S72). The discontinuity detector 129 may be designed, for example, as follows: It stores a specific reception pattern which indicates, for example, a packet loss occurred three frames prior, a normal reception occurred two frames prior, and a packet loss occurred one frame prior. When the reception pattern is recognized which has been looked for, it sets a reception state flag to off and, otherwise, it sets the reception state flag to on.

Furthermore, the discontinuity detector 129 detects a discontinuity in the same manner as described in one of the first to sixth embodiments.

Then, the stability processor 121 performs the stability process according to the reception state flag and a result of the discontinuity detection, for example, as described below (step S73).

When the reception state flag is off, the stability processor 121 performs the same process as performed when a discontinuity is not detected, regardless of a result of the discontinuity detection.

On the other hand, when the reception flag is on and when the result of the discontinuity detection indicates that a discontinuity is not detected, the stability processor 121 performs the same process as performed when a discontinuity is not detected.

Furthermore, when the reception flag is on and when the result of the discontinuity detection is detection of discontinuity, the stability processor 121 performs the same process as performed when a discontinuity is detected.

Thereafter, the operations (steps S74 to S76) of the ISF-ISP converter 122A, the ISP interpolator 122B, and the ISP-LPC converter 122C in the LP coefficient calculator 122 are performed in the same manners as performed in the first embodiment.

In the seventh embodiment as described above, the stability process is carried out depending upon a result of the discontinuity detection and the state of the reception state flag, whereby more accurate processing can be executed while it is considered how the frame is lost (e.g., whether a single frame is lost or consecutive frames are lost).

[Regarding Audio Signal Processing Programs]

The below will describe audio signal processing programs that program a computer to operate as an audio signal processing device according to the present invention.

Figure 30:
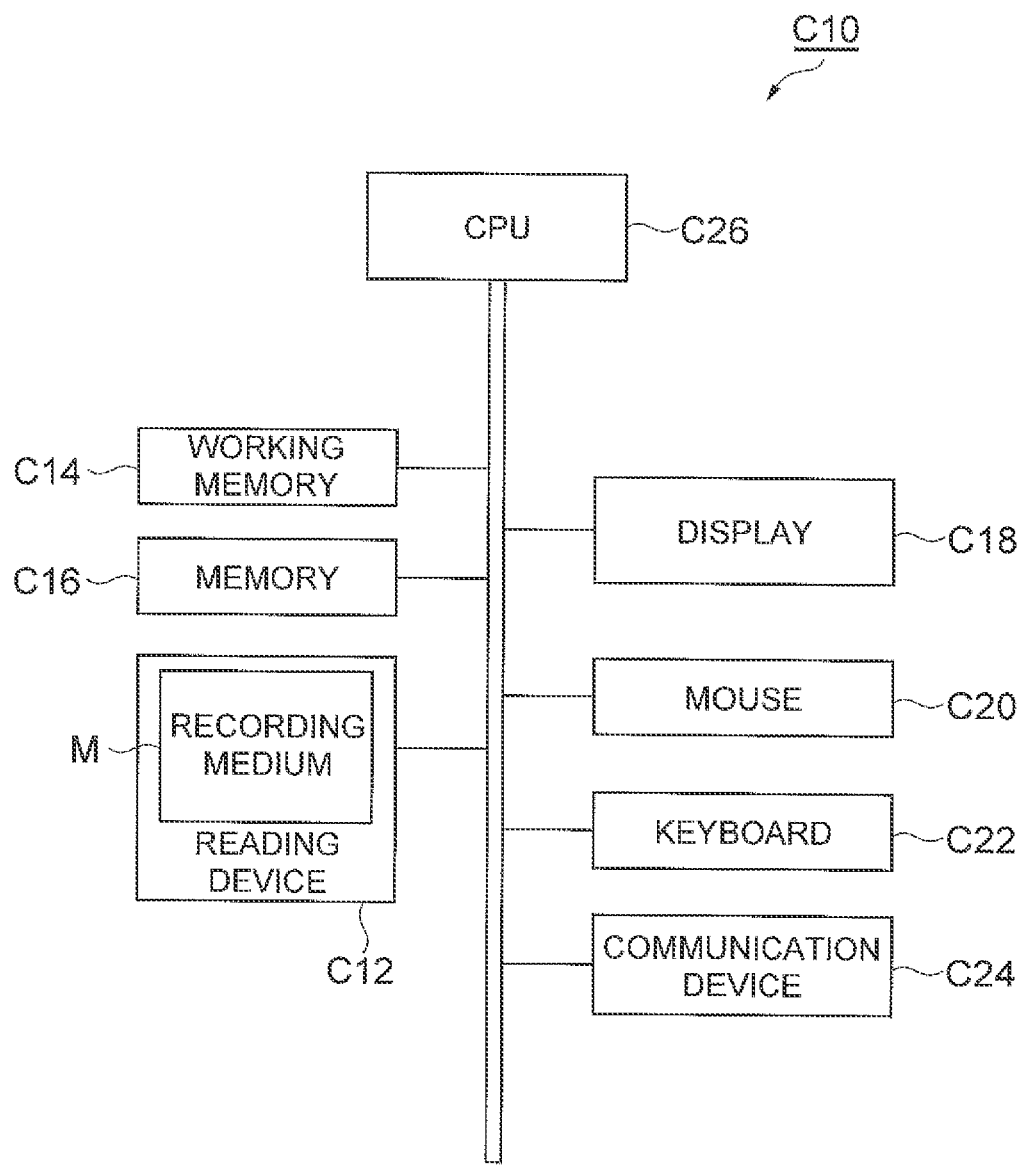
FIG. 30 is a drawing showing a hardware configuration example of a computer.
Figure 31:
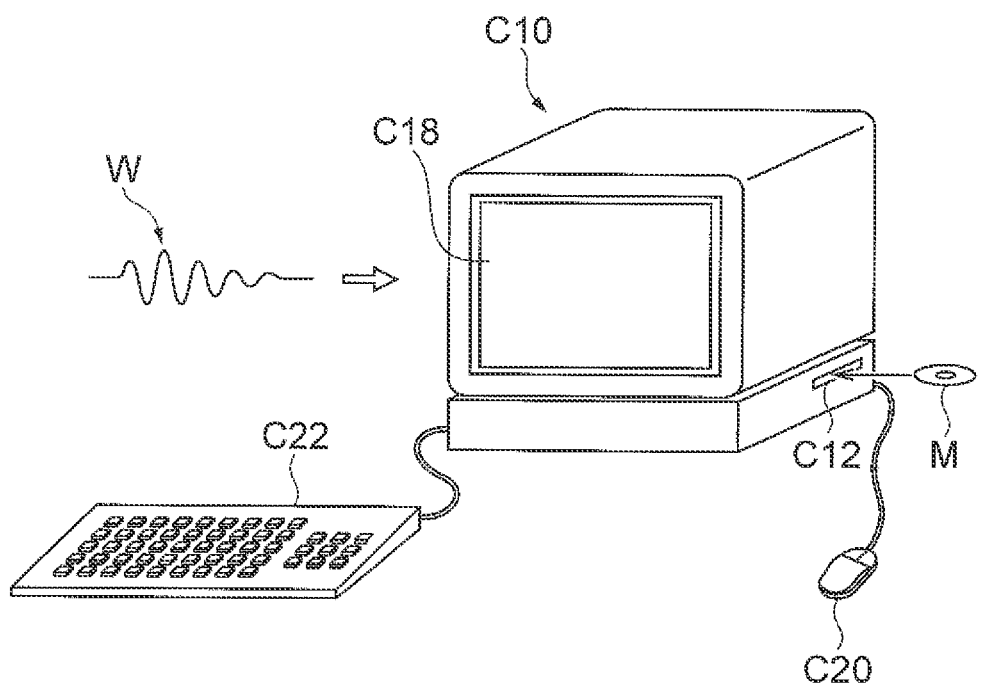
FIG. 31 is an appearance diagram of the computer.
Figure 32B:
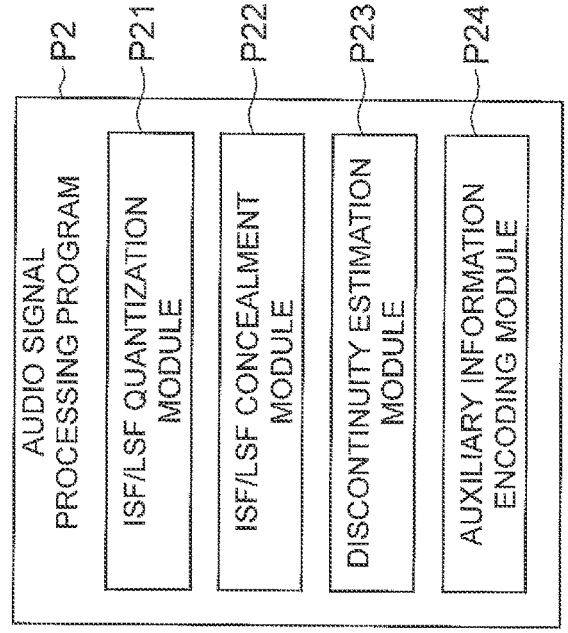
FIGS. 32(a), (b), (c), and (d) are drawings showing various examples of audio signal processing programs.
Figure 32D:
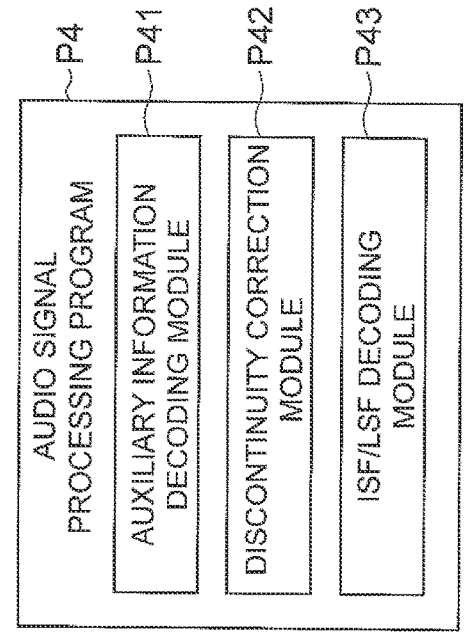
Figure 32A:
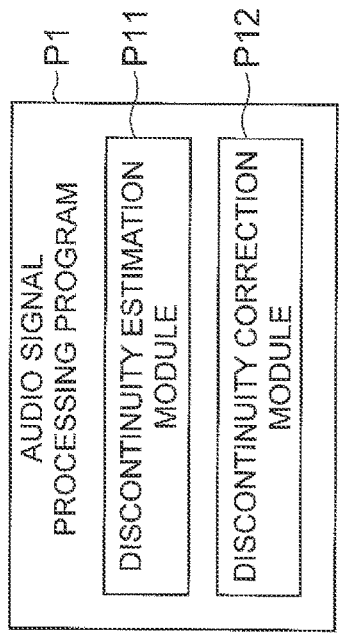
Figure 32C:
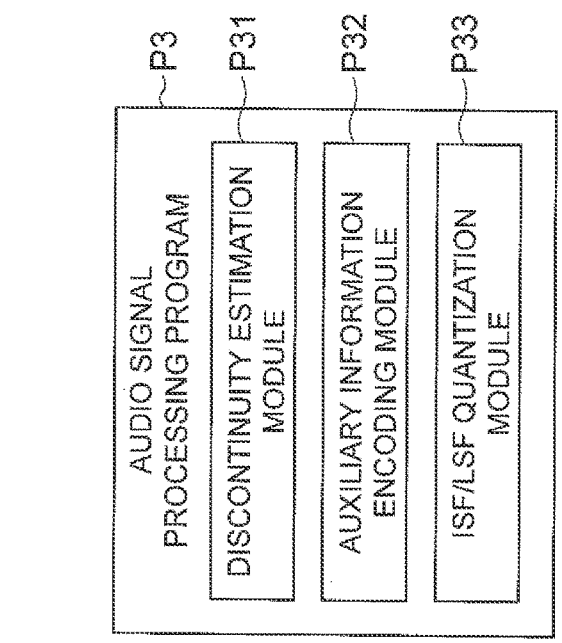

FIG. 32 is a drawing showing various exemplary configurations of the audio signal processing programs. FIG. 30 is an exemplary hardware configuration of the computer, and FIG. 31 shows a schematic view of a computer. Audio signal processing programs P1-P4 (which will be referred to hereinafter generally as "audio signal processing program P") shown in FIG. 32(a) to (d), respectively, can program the computer C10 shown in FIGS. 31 and 32 to operate as an audio signal processing device. It should be noted that the audio signal processing program P described in the present specification can be implemented not only on the computer as shown in FIGS. 31 and 32 but also on any information processing device such as a cell phone, a personal digital assistance, or a portable personal computer.

The audio signal processing program P can be provided in a form stored in a recording medium M. Examples of the recording medium M include recording media such as flexible disc, CD-ROM, DVD, or ROM, semiconductor memories, and so on.

As shown in FIG. 30, the computer C10 has a reading device C12 such as a flexible disc drive unit, a CD-ROM drive unit, or a DVD drive unit, a working memory (RAM) C14, a memory C16 for storing a program stored in the recording medium M, a display C16, a mouse C20 and a keyboard C22 as input devices, a communication device C24 for executing transmission/reception of data or the like, and a central processing unit (CPU) C26 for controlling execution of the program.

When the recording medium M is put into the reading device C12, the computer C10 becomes accessible to the audio signal processing program P stored in the recording medium M through the reading device C12 and becomes able to operate as an audio signal processing device programmed by the audio signal processing program P.

The audio signal processing program P may be one provided as computer data signal W superimposed on a carrier wave, as shown in FIG. 31, transmitted through a network. In this case, the computer C10 stores the audio signal processing program P received by the communication device C24 into the memory C16 and then can execute the audio signal processing program P.

The audio signal processing program P can be configured by adopting the various configurations shown in FIG. 32(a) to (d). For example, the audio signal processing program P1 shown in FIG. 32(a) has a discontinuity detection module P11 and a discontinuity correction module P12. The audio signal processing program P2 shown in FIG. 32(b) has an ISF/LSF quantization module P21, an ISF/LSF concealment module P22, a discontinuity detection module P23, and an auxiliary information encoding module P24. The audio signal processing program P3 shown in FIG. 32(c) has a discontinuity detection module P31, an auxiliary information encoding module P32, and an ISF/LSF quantization module P33. The audio signal processing program P4 shown in FIG. 32(d) has an auxiliary information decoding module P41, a discontinuity correction module P42, and an ISF/LSF decoding module P43.

By implementing the various embodiments described above, the subjective quality can be improved while reducing a discontinuous audio which can occur in the recovery from a packet loss at the audio start point.

The stability processor, which is the first feature of the invention, is configured so that when a discontinuity is detected in the first packet which is received correctly after a packet loss occurs, for example, a distance between elements of the ISF parameters is set wider than normal, whereby it can prevent the gain of the LP coefficients from becoming too large. Since it can prevent both the gain of the LP coefficient and the power of the excitation signal from increasing, a discontinuity of the synthesized signal is reduced, whereby a degradation of the subjective quality can be suppressed. Furthermore, the stability processor may reduce a discontinuity of the synthesized signal by multiplying the synthesized signal by the gain calculated by using the LP coefficients or the like.

The discontinuity detector, which is the second feature of the invention, monitors the gain of the excitation signal included in the first packet which is received correctly after a packet loss occurs, and determines a discontinuity for a packet whose gain of the excitation signal increased more than a certain level.

What is claimed is:

1. An audio signal processing method executed by an audio signal processing device, the method comprising:
   decoding an audio packet to obtain decoded audio;
   determining an occurrence of a discontinuity occurring with a sudden increase of an amplitude of the decoded audio obtained by decoding the audio packet, the audio packet received correctly after an occurrence of a packet loss, and
   correcting the discontinuity of the decoded audio to improve subjective quality of the decoded audio, wherein correcting the discontinuity of the decoded audio comprises causing distances between ISF/LSF parameters corresponding to a frame in which a packet loss has occurred to be equal.

2. The audio signal processing method according to claim 1, wherein determining an occurrence of a discontinuity comprises:
 a decoding step of decoding side information about a discontinuity of the decoded audio obtained by decoding an audio packet, the side information being transmitted from an encoder, and
 a determining step of determining the discontinuity of the decoded audio using the side information decoded in the decoding step.

* * * * *